(12) United States Patent  
Agrawal et al.

(10) Patent No.: US 12,141,998 B2  
(45) Date of Patent: Nov. 12, 2024

(54) ELECTRONIC DEVICE WITH GAZE-BASED AUTOFOCUS OF CAMERA DURING VIDEO RENDITION OF SCENE

(71) Applicant: MOTOROLA MOBILITY LLC, Wilmington, DE (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/697,156

(22) Filed: Mar. 17, 2022

(65) Prior Publication Data

US 2023/0298197 A1    Sep. 21, 2023

(51) Int. Cl.
| | |
|---|---|
| *G06F 3/01* | (2006.01) |
| *G06T 7/11* | (2017.01) |
| *G06T 7/70* | (2017.01) |
| *G06V 40/16* | (2022.01) |
| *H04N 23/617* | (2023.01) |
| *H04N 23/67* | (2023.01) |
| *H04N 23/69* | (2023.01) |

(52) U.S. Cl.
CPC ............. *G06T 7/70* (2017.01); *G06F 3/013* (2013.01); *G06T 7/11* (2017.01); *G06V 40/161* (2022.01); *G06T 2207/20104* (2013.01); *H04N 23/617* (2023.01); *H04N 23/675* (2023.01); *H04N 23/69* (2023.01)

(58) Field of Classification Search
CPC ... G06T 7/70; G06T 7/11; G06T 2207/20104; G06F 3/013; G06V 40/161; G06V 40/18; H04N 23/611; H04N 23/617; H04N 23/635; H04N 23/675; H04N 23/69
See application file for complete search history.

(56) References Cited

U.S. PATENT DOCUMENTS

| | | | | |
|---|---|---|---|---|
| 5,861,936 A | * | 1/1999 | Sorensen | G02C 7/101 351/200 |
| 6,478,425 B2 | * | 11/2002 | Trajkovic | G02B 7/102 351/209 |
| 7,860,382 B2 | * | 12/2010 | Grip | G02B 7/287 348/333.03 |
| 9,188,791 B2 | * | 11/2015 | Ishii | G02B 7/30 |
| 10,567,641 B1 | * | 2/2020 | Rueckner | H04N 23/62 |
| 2008/0080846 A1 | * | 4/2008 | Grip | H04M 1/0264 348/E5.045 |

(Continued)

*Primary Examiner* — Mihir K Rayan  
(74) *Attorney, Agent, or Firm* — Isidore PLLC

(57) ABSTRACT

An electronic device, a method and a computer program product for automatic camera adjustments based on eye gaze tracking. The method includes capturing, via a front facing camera, an image stream containing a face of a user and determining, via a processor, an eye gaze direction of the user based on an image retrieved from the image stream. The eye gaze direction corresponds to a location on a display where the user is looking. The method further includes mapping the location on the display to a region of interest (ROI) for focusing a rear facing camera and generating camera settings of the rear facing camera based on the ROI. The method further includes adjusting the rear facing camera using the generated camera settings such that the rear facing camera focuses on the ROI.

20 Claims, 12 Drawing Sheets

(56) References Cited

U.S. PATENT DOCUMENTS

| | | | | |
|---|---|---|---|---|
| 2010/0322479 A1* | 12/2010 | Cleveland | .............. | H04N 23/90 |
| | | | | 348/47 |
| 2013/0176208 A1* | 7/2013 | Tanaka | .................... | G06F 3/013 |
| | | | | 345/156 |
| 2013/0222638 A1* | 8/2013 | Wheeler | ............... | G06F 3/0482 |
| | | | | 348/333.01 |
| 2015/0163478 A1* | 6/2015 | Geiss | ................... | H04N 13/243 |
| | | | | 348/47 |
| 2017/0083089 A1* | 3/2017 | Mullins | ................... | G06F 3/005 |

* cited by examiner

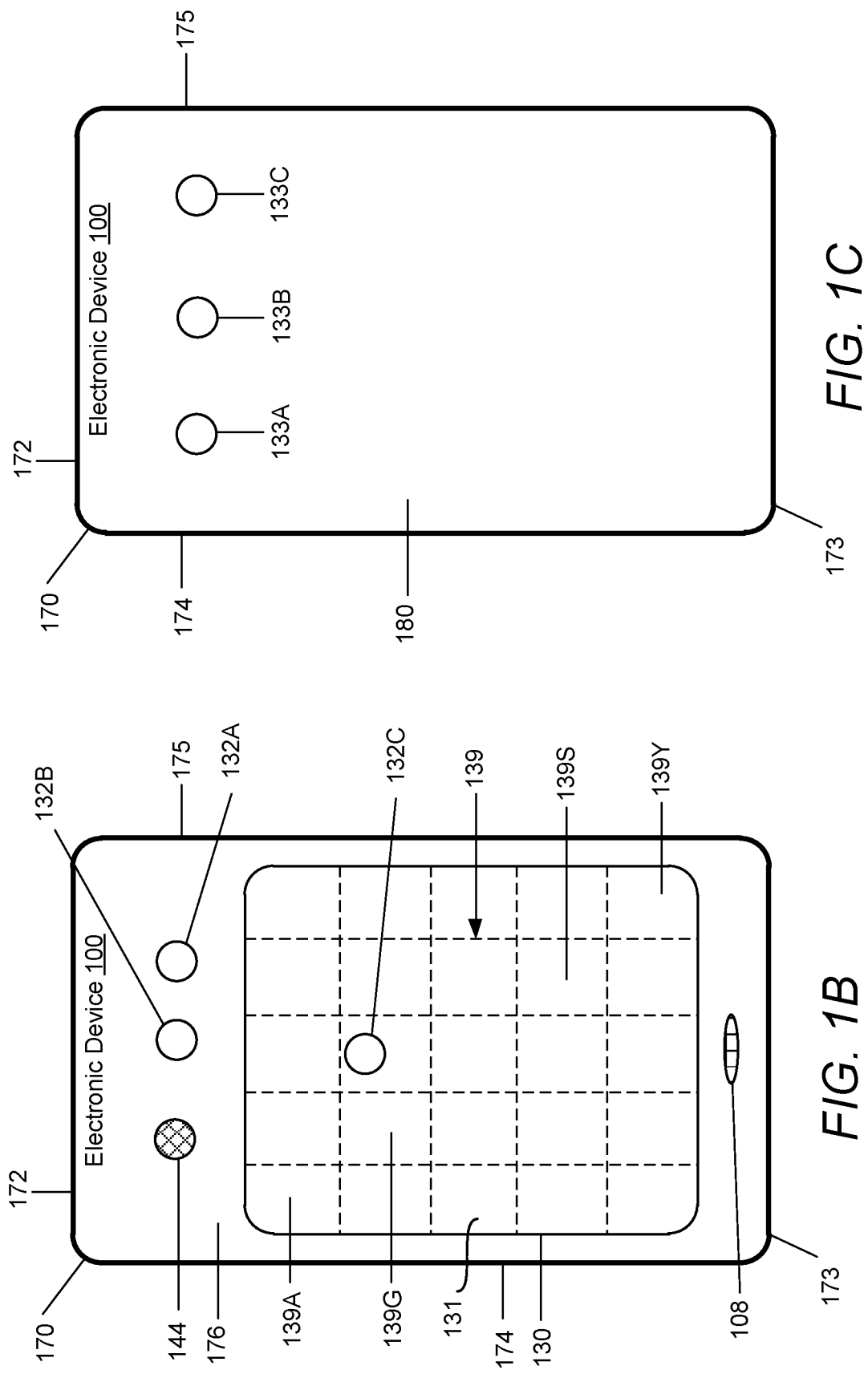

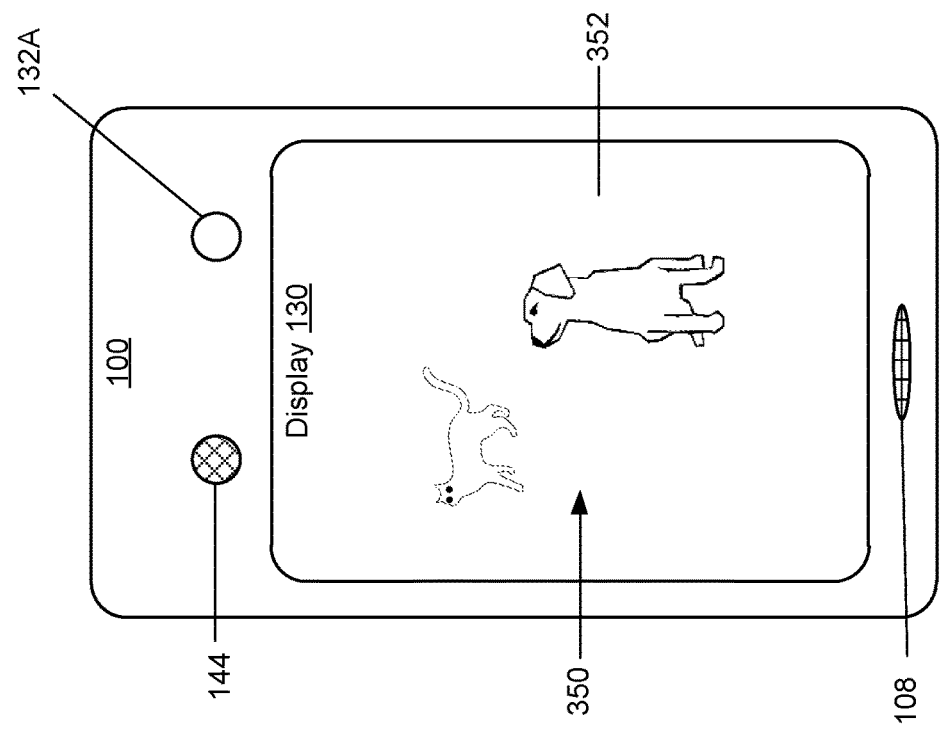
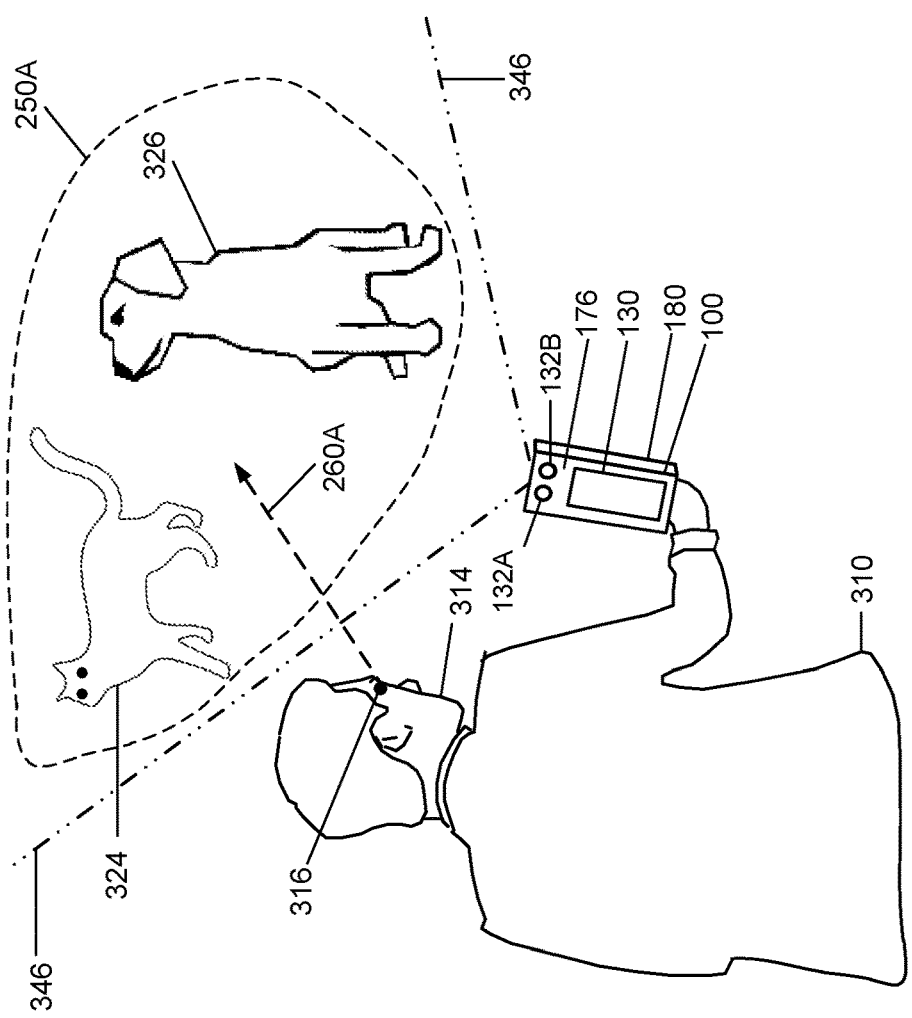
FIG. 3B
FIG. 3A

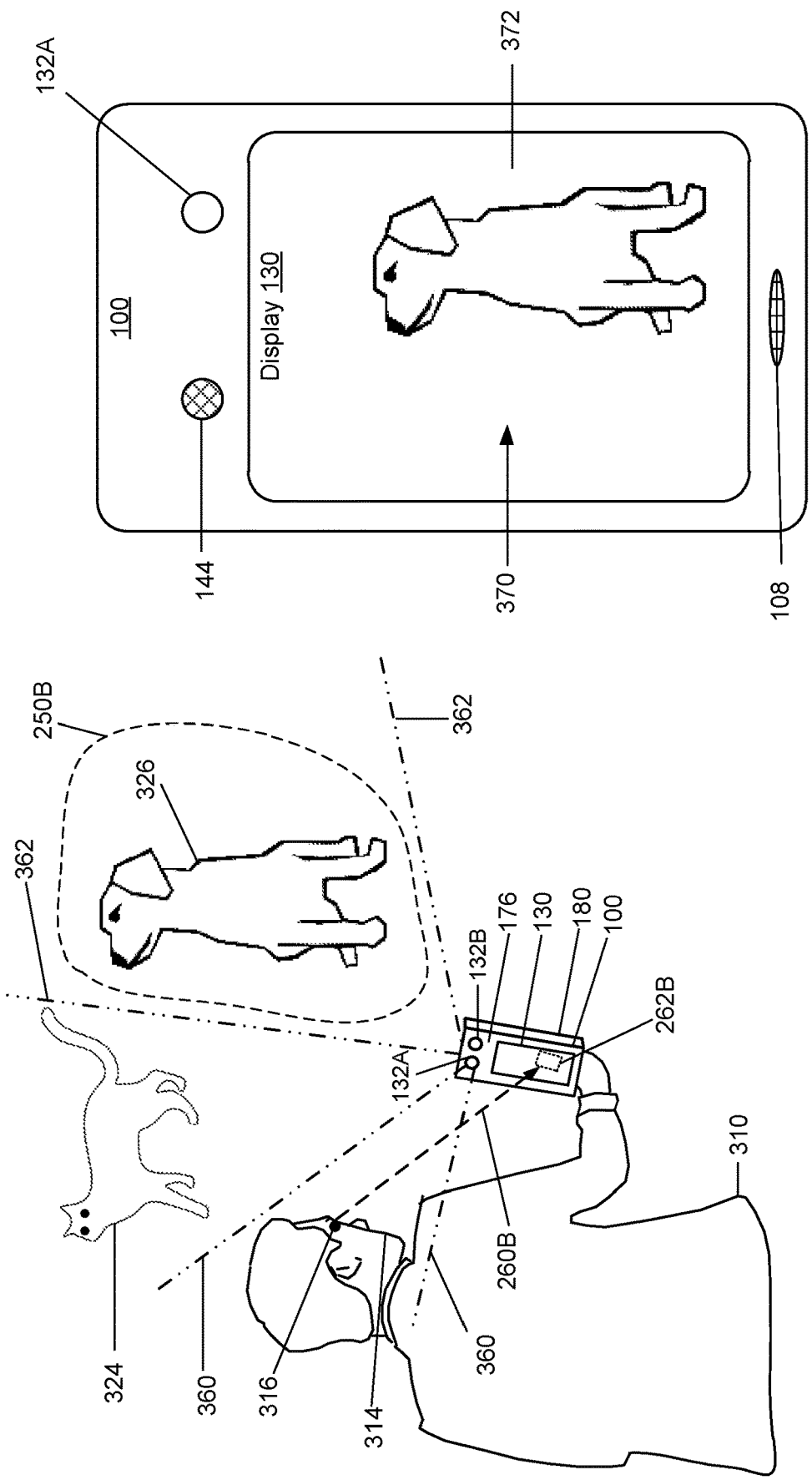

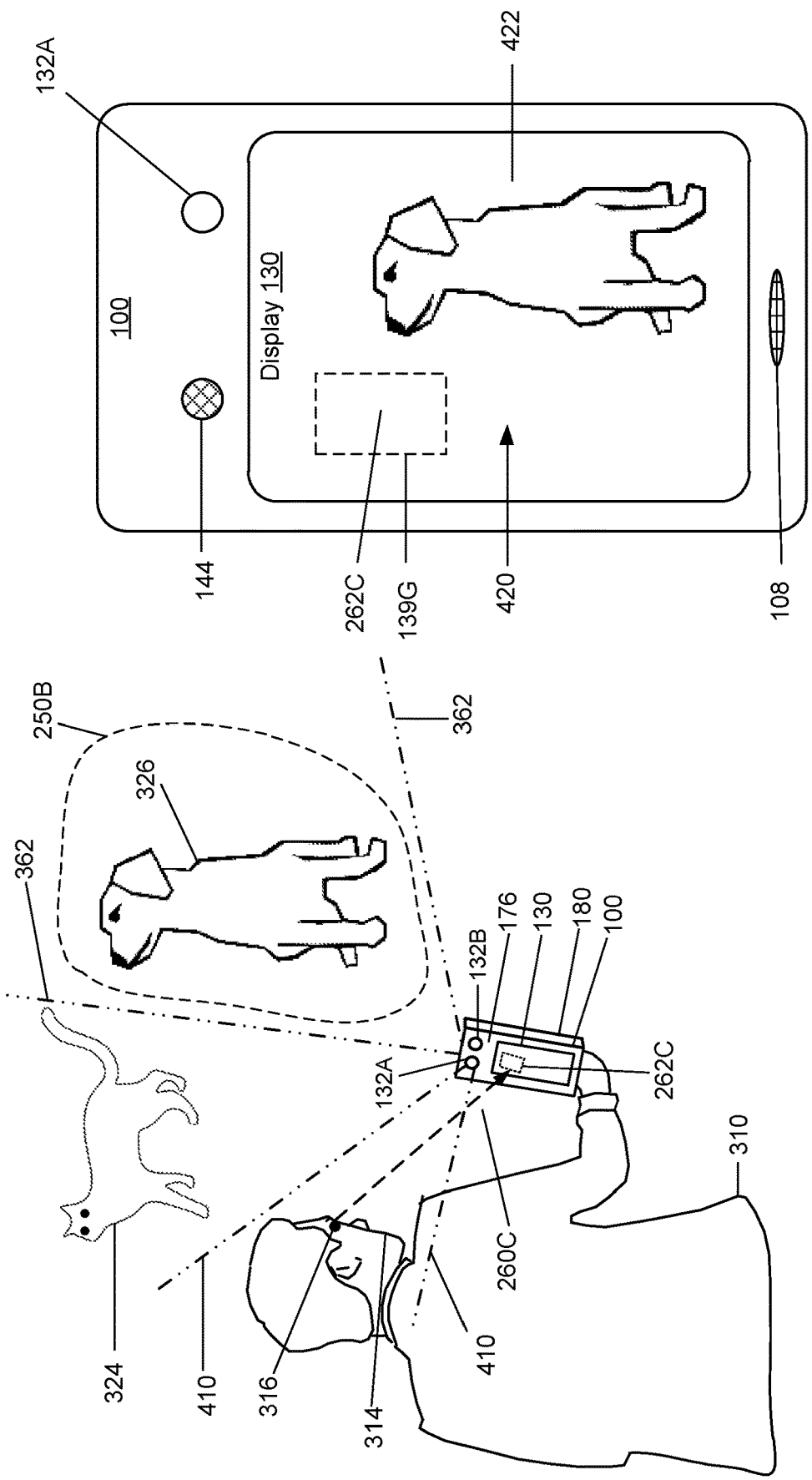

ELECTRONIC DEVICE WITH GAZE-BASED AUTOFOCUS OF CAMERA DURING VIDEO RENDITION OF SCENE

BACKGROUND

1. Technical Field

The present disclosure generally relates to electronic devices with front and rear cameras and in particular to an electronic device with automatic camera adjustments during video rendition.

2. Description of the Related Art

Electronic user devices, such as cell phones, tablets, and laptops, are widely used for communication and data transmission. These user devices support various communication modes/applications, such as text messaging, audio calling and video calling. Most implementations of these user devices typically include one or more cameras that are used for taking pictures and videos and for supporting video calling or image content streaming. Many conventional user devices have at least one front facing camera and one or more rear facing cameras. With user devices that have multiple rear facing cameras, the rear facing cameras can have lenses that are optimized for various focal angles and distances. For example, one rear facing camera can have a wide angle lens, another rear facing camera can have a telephoto lens, and an additional rear facing camera can have a macro lens. The camera systems of the user device use a combination of autofocus and manual focus. Manual focus requires a user to manually select an area or region of a scene that the user wants to focus on. Manual focus requires intervention from the user, which typically necessitates the use of both hands to select an area on a touch screen display to force the camera to focus on the selected area.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1B is an example illustration of the front of the electronic device of FIG. 1A, depicting front facing cameras, according to one or more embodiments;

FIG. 1C is an example illustration of the rear of the electronic device of FIG. 1A, with multiple rear facing cameras, according to one or more embodiments;

FIG. 3A is an example illustration of an electronic device recording video images of a scene, according to one or more embodiments;

FIG. 3B illustrates captured content presented on a display of the electronic device of FIG. 3A, according to one or more embodiments;

FIG. 3E is an example illustration of the electronic device with the user's gaze focused on a region of interest (ROI) that is identified based on the user's eye gaze location within the displayed scene, according to one or more embodiments;

FIG. 3F illustrates a zoomed in image of the scene on the display of the electronic device of FIG. 3E, after the electronic device has automatically adjusted camera settings to focus on and/or optimize the capture of video content of images located within the ROI, according to one or more embodiments;

FIG. 4A is an example illustration of the electronic device tracking an eye gaze direction, where a user has shifted their eye gaze location to a new eye gaze location on the display, according to one or more embodiments;

FIG. 4B illustrates the location of the new ROI within the scene presented on the display of the electronic device of FIG. 4A, according to one or more embodiments;

DETAILED DESCRIPTION

Figure 1A:
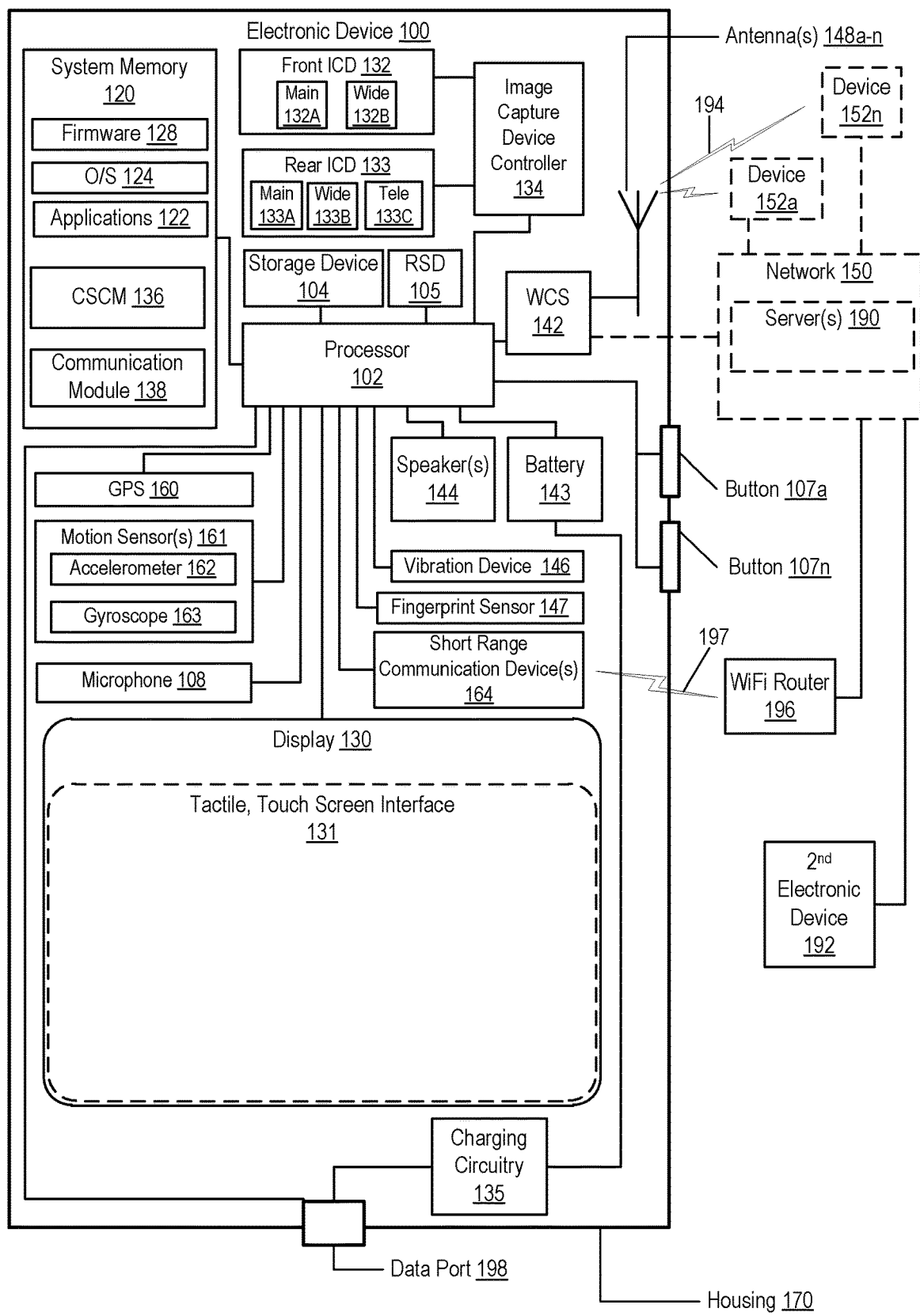
FIG. 1A depicts an example electronic device within which various aspects of the disclosure can be implemented, according to one or more embodiments.

According to one aspect of the disclosure, the illustrative embodiments provide an electronic device, a method, and a computer program product for automatic camera adjustments based on eye gaze tracking to determine a region of interest (ROI) within a display of the device. In a first embodiment, an electronic device includes a front surface with at least one front facing camera, a rear surface with at least one rear facing camera, a display embedded in the front surface, and a memory having stored thereon a camera control module (CCM) for controlling the at least one front facing camera and the at least one rear facing camera. The electronic device further includes at least one processor communicatively coupled to each of the at least one front facing camera, each of the at least one rear facing camera, the display, and the memory. The at least one processor executes program code of the CCM, which enables the electronic device to, in response to detecting a video recording session using the at least one rear facing camera, capture, via the at least one front facing camera, a first image stream containing eyes of a first user. The processor determines a first eye gaze direction of the first user, using the first image stream. The first eye gaze direction corresponds to a first location on the display where the first user is looking. The processor maps the first location on the display to a first region of interest (ROI) for focusing the at least one rear facing camera, and the processor generates at least one camera setting of the at least one rear facing camera at least partially based on the first ROI. The processor adjusts the at least one rear facing camera using the generated at least one camera setting such that the at least one rear facing camera focuses on the first ROI.

According to another embodiment, the method includes capturing, via at least one front facing camera, a first image stream containing eyes of a first user and determining, via at least one processor, a first eye gaze direction of the first user. The first eye gaze direction corresponds to a first location on the display where the first user is looking. The method further includes mapping the first location on the display to a first region of interest (ROI) for focusing the at least one rear facing camera. The method includes generating at least one camera setting of the at least one rear facing camera at least partially based on the first ROI. The method further includes adjusting the at least one rear facing camera using the generated at least one camera setting such that the at least one rear facing camera focuses on the first ROI.

According to an additional embodiment, a computer program product includes a computer readable storage device having stored thereon program code that, when executed by at least one processor of an electronic device having a front surface, a rear surface, at least one front facing camera, at least one rear facing camera, and a display, enables the electronic device to complete the functionality of one or more of the above described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1A) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1A depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer and a communication device, etc. It is appreciated that electronic device 100 can be other types of devices that include both at least one front facing camera and at least one rear facing camera and which supports both video and non-video communication with one or more second electronic devices. Electronic device 100 includes processor 102, which is communicatively coupled to storage device 104, system memory 120, input devices, introduced below, output devices, such as display 130, and image capture device (ICD) controller 134. Processor 102 can include processor resources such as a central processing unit (CPU) that support computing, classifying, processing, and transmitting of data and information. According to one or more embodiments, ICD controller 134 performs or supports functions such as, but not limited to, selecting and activating an active camera from among multiple cameras, adjusting the camera settings and characteristics (e.g., shutter speed, f/stop, ISO exposure, zoom control, etc.) of the active camera, etc. ICD controller 134 can perform these functions in response to commands received from processor 102, which is executing camera control module (CCM) 136. In one or more embodiments, the functionality of ICD controller 134 is incorporated within processor 102, eliminating the need for a separate ICD controller. For simplicity in describing the features presented herein, the various camera selection, activation, and configuration functions performed by the ICD controller 134 are described as being provided generally by processor 102.

System memory 120 may be a combination of volatile and non-volatile memory, such as random access memory (RAM) and read-only memory (ROM). System memory 120 can store program code or similar data associated with firmware 128, an operating system 124, applications 122, camera control module (CCM) 136, and communication module 138. CCM 136 includes program code that is executed by processor 102 to enable electronic device 100 to adjust camera settings based on eye gaze tracking. Communication module 138 includes program code that is executed by processor 102 to enable electronic device 100 to communicate with other external devices and systems.

Although depicted as being separate from applications 122, CCM 136 and communication module 138 may be each implemented as an application. Processor 102 loads and executes program code stored in system memory 120. Examples of program code that may be loaded and executed by processor 102 include program code associated with applications 122 and program code associated with CCM 136 and communication module 138.

In one or more embodiments, electronic device includes removable storage device (RSD) 105, which is inserted into an RSD interface (not shown) that is communicatively coupled via system interlink to processor 102. In one or more embodiments, RSD 105 is a non-transitory computer program product or computer readable storage device. RSD 105 may have a version of CCM 136 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Throughout the disclosure, the term image capturing device is utilized interchangeably to be synonymous with and/or refer to any one of front or rear facing cameras 132, 133. Front facing cameras (or image capture device (ICD)) 132 are communicatively coupled to ICD controller 134, which is communicatively coupled to processor 102. ICD controller 134 supports the processing of signals from front facing cameras 132. Front facing cameras 132 can capture images that are within the field of view (FOV) of image capture device 132. Electronic device 100 includes several front facing cameras 132. First front facing camera 132A is a main camera that captures a standard angle FOV. Second front facing camera 132B is wide angle camera that captures a wide angle FOV. Front facing cameras 132A and 132B can be collectively referred to as front facing cameras 132A-132B or front facing camera(s) 132. While two front facing cameras 132A-132B are shown, electronic device 100 can have more or less than two front facing cameras.

Electronic device 100 further includes several rear facing cameras 133. First rear facing camera 133A is a main camera that captures a standard angle FOV. Second rear facing camera 133B is wide angle camera that captures a wide angle FOV. Third rear facing camera 133C is a telephoto ICD that captures a telephoto FOV (zoom or magnified). Each rear facing camera 133A, 133B, and 133C is communicatively coupled to ICD controller 134, which is communicatively coupled to processor 102. ICD controller 134 supports the processing of signals from rear facing cameras 133A, 133B and 133C. Rear facing cameras 133A, 133B and 133C can be collectively referred to as rear facing cameras 133A-133C or rear facing cameras 133. While three rear facing cameras are shown, electronic device 100 can have less than three rear facing cameras, such as having only one or two rear facing cameras, or can have more than three rear facing cameras.

Electronic device 100 can further include data port 198, charging circuitry 135, and battery 143. Electronic device 100 further includes microphone 108, one or more output devices such as speakers 144, and one or more input buttons 107a-n. Input buttons 107a-n may provide controls for volume, power, and image capture device 132. Microphone 108 can also be referred to as audio input device 108. Microphone 108 and input buttons 107a-n can also be referred to generally as input devices.

Electronic device 100 further includes wireless communication subsystem (WCS) 142, which is coupled to antennas 148a-n. In one or more embodiments, WCS 142 can include a communication module with one or more baseband processors or digital signal processors, one or more modems, and a radio frequency (RF) front end having one or more transmitters and one or more receivers. Wireless communication subsystem (WCS) 142 and antennas 148a-n allow electronic device 100 to communicate wirelessly with wireless network 150 via transmissions of communication signals 194 to and from network communication devices 152a-n, such as base stations or cellular nodes, of wireless network 150. In one embodiment, communication network devices 152a-n contain electronic communication equipment to allow communication with electronic device 100.

Wireless network 150 further allows electronic device 100 to wirelessly communicate with second electronic devices 192, which can be similarly connected to wireless network 150 via one of network communication devices 152a-n. Wireless network 150 is communicatively coupled to wireless fidelity (WiFi) router 196. Electronic device 100 can also communicate wirelessly with wireless network 150 via communication signals 197 transmitted by short range communication device(s) 164 to and from WiFi router 196, which is communicatively connected to network 150. In one or more embodiment, wireless network 150 can include one or more servers 190 that support exchange of wireless data and video and other communication between electronic device 100 and second electronic device 192.

Electronic device 100 further includes short range communication device(s) 164. Short range communication device 164 is a low powered transceiver that can wirelessly communicate with other devices. Short range communication device 164 can include one or more of a variety of devices, such as a near field communication (NFC) device, a Bluetooth device, and/or a wireless fidelity (Wi-Fi) device. Short range communication device 164 can wirelessly communicate with WiFi router 196 via communication signals 197. In one embodiment, electronic device 100 can receive internet or Wi-Fi based calls via short range communication device 164. In one embodiment, electronic device 100 can communicate with WiFi router 196 wirelessly via short range communication device 164. In an embodiment, WCS 142, antennas 148a-n and short-range communication device(s) 164 collectively provide communication interface(s) of electronic device 100. These communication interfaces enable electronic device 100 to communicatively connect to at least one second electronic device 192 via at least one network.

Electronic device 100 further includes vibration device 146, fingerprint sensor 147, global positioning system (GPS) device 160, and motion sensor(s) 161. Vibration device 146 can cause electronic device 100 to vibrate or shake when activated. Vibration device 146 can be activated during an incoming call or message in order to provide an alert or notification to a user of electronic device 100. According to one aspect of the disclosure, display 130, speakers 144, and vibration device 146 can generally and collectively be referred to as output devices.

Fingerprint sensor 147 can be used to provide biometric data to identify or authenticate a user. GPS device 160 can provide time data and location data about the physical location of electronic device 100 using geospatial input received from GPS satellites.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. In one or more embodiments, the measurements of these various sensors can also be utilized by processor 102 in the determining of the context of a communication. Electronic device 100 further includes housing 170 that contains/protects the components of electronic device 100.

In the description of each of the following figures, reference is also made to specific components illustrated within the preceding figure(s) Similar components are presented with the same reference number and some components may be provided with a subscripted reference number (e.g., 100a, 100b) to represent a same component/device being shown in a different context/configuration.

Turning to FIG. 1B, additional details of the front surface of electronic device 100 are shown. Electronic device 100 includes housing 170 that contains the components of electronic device 100. Housing 170 includes top 172, bottom 173, and opposed sides 174, 175. Housing 170 further includes front surface 176. Various components of electronic device 100 are located on/at front surface 176. Microphone 108, display 130, front facing cameras 132A, 132B, 132C, and speaker 144 are located on/at front surface 176. In the illustrative embodiment, front facing camera 132C is a camera under display (CUD).

According to one embodiment illustrated by FIG. 1B, display 130 can include an underlying display grid 139 that divides display 130 into several individual grids 139A-139Y, which are each associated with a location within a displayed image/video that can be described as a region of interest (ROI). Display grid 139 can be used to identify a specific location on display 130 where a user is looking. It is appreciated that display grid 139 is a virtual/background construct that is not visible to a user. In FIG. 1B, each row of grids is consecutively labeled using the alphabet. For example, the first upper row of grids includes grids 139A, 139B, 139C, 139D and 139E. The next lower row of grids would be labeled grids 139F, 139G, 139H, 139I and 139J and continue for the remaining rows.

With additional reference to FIG. 1C, additional details of the rear surface of electronic device 100 are shown. Housing 170 includes rear surface 180. Various components of electronic device 100 are located on/at rear surface 180, including rear facing cameras 133. Specifically, rear facing main FOV camera 133A, rear facing wide angle FOV camera 133B, and rear facing telephoto angle FOV camera 133C are illustrated located on rear surface 180. Each of the multiple rear facing cameras can have different image capturing characteristics. For example, rear facing telephoto angle FOV camera 133C can include an optical zoom lens that is optimized for capturing images of distant objects.

Figure 2:
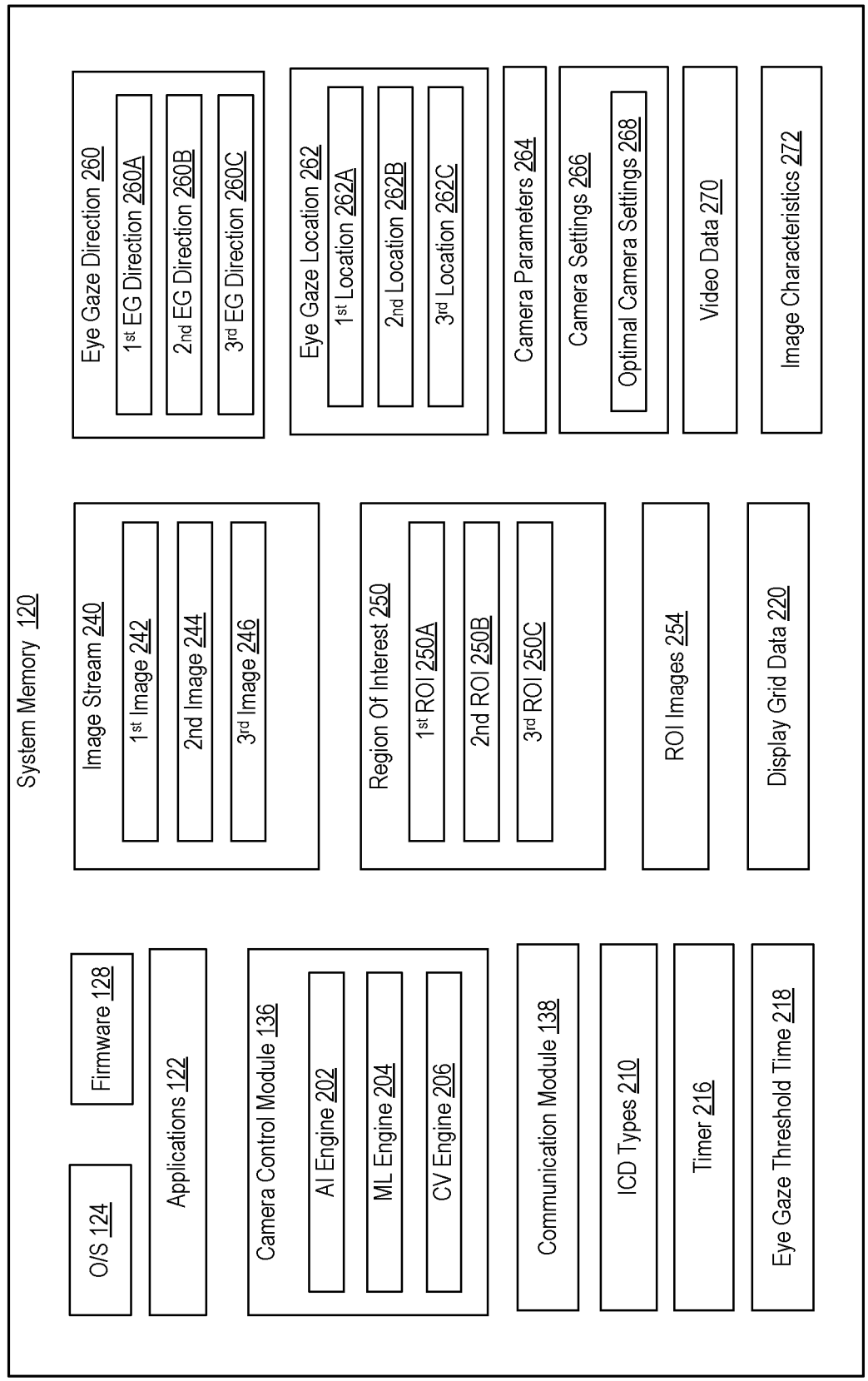
FIG. 2 is a block diagram of example contents of the system memory of the example electronic device of FIG. 1A, according to one or more embodiments.

Referring to FIG. 2, there is shown one embodiment of example contents of system memory 120 of electronic device 100. System memory 120 includes data, software, and/or firmware modules, including applications 122, operating system 124, firmware 128, CCM 136, and communication module 138.

CCM 136 includes program code that is executed by processor 102 to enable electronic device 100 to perform the various features of the present disclosure. In one or more embodiments, CCM 136 enables electronic device 100 to track an eye gaze direction of a user within a display and to automatically adjust an active camera based on the eye gaze tracking. The active camera corresponds to a rear facing camera with a field of view (FOV) containing a region of interest (ROI) within a display to which the first user is looking. In an embodiment, CCM 136 can include an artificial intelligence (AI) engine 202, a machine learning (ML) engine 204 and computer vision (CV) engine 206 that enables electronic device 100 to generate and adjust camera settings. In one or more embodiments, execution of CCM 136 by processor 102 enables/configures electronic device 100 to perform the processes presented in the flowcharts of FIGS. 5 (5A-5B), and 6 (6A-6B) as will be described below.

Communication module 138 enables electronic device 100 to communicate with wireless network 150 and with other devices, such as second electronic device 192, via one or more of audio, text, and video communications. Communication module 138 supports various communication sessions by electronic device 100, such as audio communication sessions, video communication sessions, text communication sessions, communication device application communication sessions, or a dual/combined audio/text/video communication session.

System memory 120 further includes ICD/camera types 210, timer 216, eye gaze threshold time 218 and display grid data 220. ICD/camera types 210 contains information identifying the specific front facing cameras 132 and rear facing cameras 133 that are included in electronic device 100 and/or settings/characteristics of each camera. Timer 216 can track the amount of time that a user's eye gaze has rested/remained on a specific location of display 130. Eye gaze threshold time 218 is a preset minimum amount of time that a user's eye gaze has to remain on the same specific location of display 130 (i.e., within a small deviation in general direction) to trigger the determination of a ROI. Eye gaze threshold time 218 is a minimum amount of time that a user is looking at the same location on display 130 before the controller will adjust camera settings to zoom/focus at least one of rear facing cameras 133A-133C on the ROI. Display grid data 220 is data about display grid 139 that divides display 130 into several individual grids 139A-139Y that are associated respectively with different ROIs.

System memory 120 further includes image stream 240, region of interest (ROI) 250, ROI images 254, eye gaze direction 260, and eye gaze location 262. Image stream 240 is a stream of images (e.g., multiple still photographs or a continuous video) captured by at least one of front facing cameras 132A-132B. Example image stream 240 includes one or more images such as first image 242, second image 244, and third image 246. In one embodiment, image stream 240 can contain the face of a user of electronic device 100.

ROI 250 is an area within a FOV of at least one of rear facing cameras 133A-133C that corresponds to the specific location where a user is looking on display 130. Example ROI 250 includes one or more ROIs, such as first ROI 250A, second ROI 250B, and third ROI 250C. ROI images 254 are images of a ROI captured by at least one of rear facing cameras 133A-133C.

Eye gaze direction 260 is the direction that a user of electronic device 100 is looking relative to display of electronic device 100. Eye gaze direction 260 can include a plurality of discrete directions, such as first eye gaze direction 260A, second eye gaze direction 260B, and third eye gaze direction 260C. In one embodiment, eye gaze direction 260 can be defined as an angular value from the planar front surface 176 or rear surface 180 of electronic device 100. In this example 0 degrees can be defined as a straight ahead direction that is perpendicular to front surface 176 and rear surface 180. A user looking to the right can have a horizontal eye gaze direction 260 that is a positive angular value (e.g., +15 degrees) and a user looking to the left can have a horizontal eye gaze direction 260 that is a negative angular value (e.g., −15 degrees) relative to the horizontal plane. A user with eye gaze directed upwards can have a positive vertical eye gaze direction (e.g., +10 degrees) and a user with eye gaze directed downwards (e.g., towards the floor behind the electronic device) can have a negative vertical eye gaze direction (e.g., −30 degrees).

Eye gaze location 262 is a specific location that a user of electronic device 100 is looking, which correlates to and is determined based on the eye gaze direction 260. Eye gaze location 262 can include a plurality of discrete locations, such as first location 262A, second location 262B, and third location 262C. According to one embodiment, eye gaze location 262 can include the orientation to the location where the user is looking based on the corresponding eye gaze direction. For example, eye gaze location 262 can have a vertical orientation of 5 degrees upwards, and a horizontal direction that is positive (right) 15 degrees from the front surface 176 of electronic device 100. It is appreciated that the dimensions and orientations measurements would be based on the front surface of electronic device 100 representing a vertical/Y plane, in a 3-dimensional X-Y-Z axes coordinate plane extending through a center point of the front surface of electronic device 100.

In one embodiment, first location 262A is a location on display 130 where a user is looking and corresponds to first ROI 250A that is within view of at least one of rear facing cameras 133A-133C. Second location 262B is a location on display 130 where a user is looking at (e.g., grid 139S). Second location 262B corresponds to second ROI 250B that is within view of at least one of rear facing cameras 133A-133C. Third location 262C is a location on display 130 where a user is looking at (e.g., grid 139G). Third location 262C corresponds to third ROI 250C that is within view of at least one of rear facing cameras 133A-133C.

System memory 120 further includes camera parameters 264 and camera settings 266. Camera parameters 264 are values that are associated with cameras 132A-132B and 133A-133C. Camera parameters 264 are at least partially used in determining camera settings 266 for cameras 132A-132B and 133A-133C. Camera parameters 264 can include fixed values such as focal length, maximum frame rate, and resolution and variable values such as light level values, directional values, and distances to objects within a camera FOV.

Camera settings 266 are values and characteristics that can change during the operation of cameras 132A-132B and 133A-133C to capture images by the cameras. In one embodiment, camera settings 266 can be determined by either processor 102 or by ICD controller 134. Camera settings 266 can include various settings such as aperture, shutter speed, iso level, white balance, zoom level, directional settings (i.e., region of interest (ROI)), distance settings, focus and others. Camera settings 266 can include optimal camera settings 268 that are selected to optimize the quality of the video images captured by the cameras and shown on display 130. Optimal camera settings 268 can include zoom levels, focus distance, and directional settings that allow images within a camera FOV and that are desired to be captured to be in focus, centered, and correctly sized for display on display 130.

Optimal camera settings 268 can further include digital crop levels, focal distance of the focus module and directional audio zoom. Cropping is the removal or trimming of unwanted parts of an image within a FOV to generate a cropped FOV. The directional audio zoom enables microphone 108 to be tuned to receive audio primarily in the direction of a cropped FOV in a desired ROI. Optimal camera settings 268 can further include modified electronic image stabilization (EIS) that enables stabilization to be optimized for subjects in a cropped FOV and exposure compensation that enables the cropped FOV to not be under or over exposed in a camera preview (viewfinder).

System memory 120 further includes video data 270 and image characteristics 272. Video data 270 is image content or video information that is recorded or captured by cameras 132A-132B and 133A-133C. In one embodiment, video data 270 can be exchanged between electronic device 100 and second electronic device 192.

Image characteristics 272 are attributes identified as associated with an ROI 250 and are used to adjust one or more camera settings to focus the camera on the ROI. Image characteristics 272 can be determined from one or more captured ROI images 254 that have been captured by a rear facing camera. For example, image characteristics 272 can include light levels at the ROI, face detection at the ROI, and scene detection at the ROI. Image characteristics 272 can further include contrast detection autofocus that achieves focus on a subject based on the contrast change of the edges in the ROI. Alternatively, image characteristics 272 can include phase detection autofocus that enables focusing on a subject based on the convergence of two separate beams of light. Image characteristics 272 can further include computer vision (CV), machine learning (ML), and artificial intelligence (AI) based techniques for determining an object of interest within the ROI.

FIG. 3A illustrates electronic device 100 being used by a user 310 to record or capture video data 270. A cat 324 and a dog 326 are located behind rear surface 180 away from electronic device 100. The face 314 of the user 310 includes a pair of eyes 316 that are looking in first eye gaze direction 260A. In FIG. 3A, the user is looking at cat 324 and dog 326 along first eye gaze direction 260A towards first ROI 250A. First ROI 250A includes cat 324 and dog 326. Cat 324 and dog 326 are within FOV 346 of the active camera (i.e., rear facing main camera 133A).

Turning to FIG. 3B, electronic device 100 is illustrated with an example GUI 350 presented on display 130 during video recording. GUI 350 includes captured video data (i.e., video image 352) of first ROI 250A including cat 324 and dog 326 captured by rear facing main camera 133A.

Figure 3D:
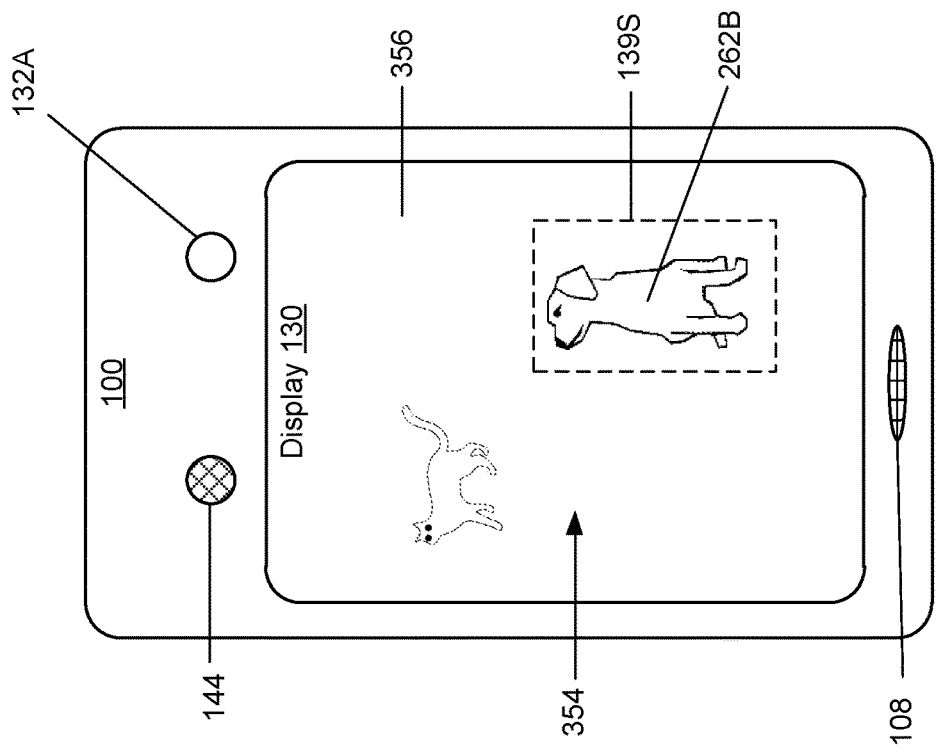
FIG. 3D illustrates content of the scene being presented on the display of the electronic device of FIG. 3C, according to one or more embodiments.
Figure 3C:
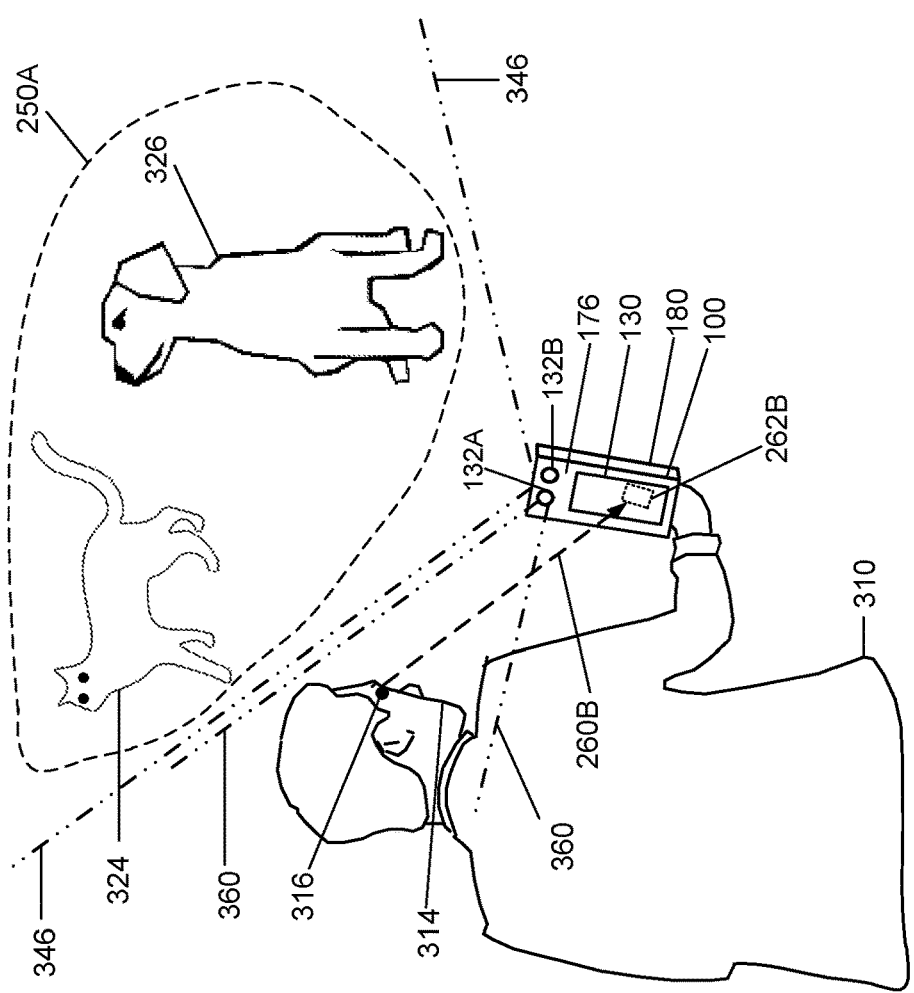
FIG. 3C is an example illustration of the electronic device recording video images, where a user has shifted their eye gaze from the scene being recorded to a location on the display, according to one or more embodiments.

Referring to FIG. 3C, electronic device 100 is further shown after the eye gaze direction of a user has changed during video recording. In FIG. 3C, user 310 has looked away from first ROI 250A containing cat 324 and dog 326 and is now looking at display 130, which is presenting the scene including cat and dog at first ROI 250A. In FIG. 3C, the user is looking at display 130 embedded in front surface 176 of electronic device 100 and the eye gaze direction 260B is oriented toward second location 262B on display 130. User 310 is looking in second eye gaze direction 260B towards second location 262B within a video image presented on display 130. Front facing camera 132A has a field of view (FOV) 360 that captures an image stream 240 including first image 242 containing the face 314 of user 310. The face 314 of the user 310 includes a pair of eyes 316 that are looking in second eye gaze direction 260B toward a second location 262B presented within display 130.

CCM 136 enables electronic device 100 to capture, via front facing camera 132A, an image stream 240 including first image 242 containing a face 314 of user 310 and determine, via processor 102, second eye gaze direction 260B and corresponding second location 262B based on first image 242 retrieved from the image stream 240. Second eye gaze direction 260B corresponds to second location 262B on display 130 where the user is looking. Second location 262B on display 130 further corresponds to the specific grid 139S (FIG. 1B) where the user is looking, in one embodiment.

According to one aspect of the disclosure, CCM 136 enables electronic device 100 to recognize the face 314 of a user and to track the eyes 316 of the user to determine second eye gaze direction 260B and corresponding second location 262B. More specifically, CCM 136 enables electronic device 100 to detect the presence of eyes within a FOV of front facing camera 132A, to identify precise eye positions, and to determine an eye gaze direction and eye gaze location (within the displayed scene on display 130) based on the eye positions.

In one embodiment, second eye gaze direction 260B and corresponding second location 262B are not determined until the users gaze has rested (i.e., remained fixed) for a preset minimum amount of time (i.e., eye gaze threshold time 218) on the same specific area of display 130 (i.e., within a small deviation from the general direction). In one embodiment, for example, second eye gaze direction 260B is not determined until the user's gaze has rested on a specific area for more than 2-3 seconds. The exact value of the preset minimum amount of time can be a variable that has a default value or a value based on the current device/application setting. The setting can further be modified/adjusted by the user, using a presented settings GUI to be more or less sensitive to changes in eye gaze direction.

With reference to FIG. 3D, electronic device 100 is illustrated with an example GUI 354 presented on display 130 during video recording. GUI 354 includes captured video data (i.e., video image 356) of first ROI 250A. Second location 262B where the user is looking is indicated on display 130 and grid 139S corresponding to second location 262B is also presented in phantom on display 130, for illustration only. It is appreciated that grid 139S does not actually appear to the user viewing display 130.

Referring to FIG. 3E, electronic device 100 is further shown after electronic device 100 has (i) determined, based on detection of second eye gaze direction 260B towards second location 262B within display 130, that there is a new ROI, (ii) generated at least one new camera setting and (iii) adjusted at least one camera setting of the active rear facing camera. Specifically, CCM 136 enables electronic device 100 to map second location 262B (i.e., grid 139S) on display 130 to a new second ROI 250B containing dog 326. CCM 136 further enables electronic device 100 to generate at least one new camera setting 266 of active rear facing camera 133A at least partially based on the new second ROI 250B. CCM 136 further enables electronic device 100 to adjust the active rear facing camera 133A using the generated new camera setting 266 such that the rear facing camera 133A focuses on the new second ROI 250B. In one embodiment, the generated camera settings 266 can be optimal camera settings 268 that provide an optimal sized and zoomed image on display 130 of the video recording of second ROI 250B.

In one embodiment, adjusting the active rear facing camera using the generated new camera settings 266 can include adjusting a directional setting of the rear facing camera 133A to focus the FOV 362 of rear facing camera 133A on the new second ROI 250B that is determined from the current eye gaze location (i.e., second location 262B). In another embodiment, adjusting the active rear facing camera using the generated new camera settings 266 can include adjusting a zoom level of the rear facing camera 133A to magnify or reduce captured images of the new ROI (i.e., second ROI 250B). In an additional embodiment, adjusting the active rear facing camera using the generated new camera settings 266 can include adjusting a focal distance of the rear facing camera 133A to focus the rear facing camera on the new ROI (i.e., second ROI 250B). In one embodiment, a different one of the rear-facing cameras can be selected to be the active rear camera in instances in which the previous active rear camera is unable to provide a good or complete view of the ROI within the display. For example, when the ROI is at a periphery of the FOV of a standard rear camera, a wide angled camera can be selected to be the active rear camera to be able to focus on the entire ROI without having to crop the edges of the video images. Other camera settings adjustments can be made based on the detected amount of light, exposure settings and other identified image characteristics of the new ROI.

Additionally, in one or more embodiments, electronic device 100 also can provide a focused view of objects within the ROI and can provide a non-focused view of objects outside of the ROI on display 130. For example, electronic device 100 can provide a focused view of dog 326 inside second ROI 250B and a non-focused (or blurred) view of cat 324 outside of second ROI 250B.

Turning to FIG. 3F, display 130 of electronic device 100 is shown after determining new second ROI 250B and adjusting camera settings of the active rear facing camera 133A. Electronic device 100 is illustrated with example GUI 370 presented on display 130 during video recording. GUI 370 includes captured video data (i.e., video image 372) that is focused on second ROI 250B. In FIG. 3F, electronic device 100 has adjusted a directional setting and zoom level of rear facing camera 133A to optimally capture video image 372 of second ROI 250B and display the video image on display 130.

According to one aspect of the disclosure, electronic device 100 can automatically determine an eye gaze direction and location of a user and map the eye gaze location to a ROI. Electronic device 100 can further automatically generate new camera settings and adjust the camera settings of the active rear facing camera to optimally capture video images within the ROI. By automatically generating and adjusting new camera settings of the active rear facing camera based on the detected movement of the user's eye gaze on images within the scene presented on display 130, electronic device 100 frees the user from the task of having to manually adjust camera settings such as directional settings (panning), zoom levels and focal distances when the user's eye gaze direction and location on display 130 changes.

With reference to FIG. 4A, electronic device 100 is shown tracking the eye gaze direction and corresponding eye gaze location of a user during a video recording session. In FIG. 4A, user 310 has looked away from second location 262B towards third location 262C on display 130. That is, user 310 is looking in third eye gaze direction 260C towards third location 262C. Front facing camera 132A has a field of view (FOV) 410 that captures an image stream 240 including second image 244 containing the face 314 of user 310. The face 314 of the user 310 includes a pair of eyes 316 that are looking in third eye gaze direction 260C toward third location 262C.

Turning to FIG. 4B, electronic device 100 is illustrated with an example GUI 420 presented on display 130 during video recording. GUI 420 includes captured video data (i.e., video image 422) that includes second ROI 250A. GUI 420 further includes third location 262C on display 130 where the user is looking. Grid 139G corresponding to third location 262C is also shown in phantom on display 130.

Figure 4D:
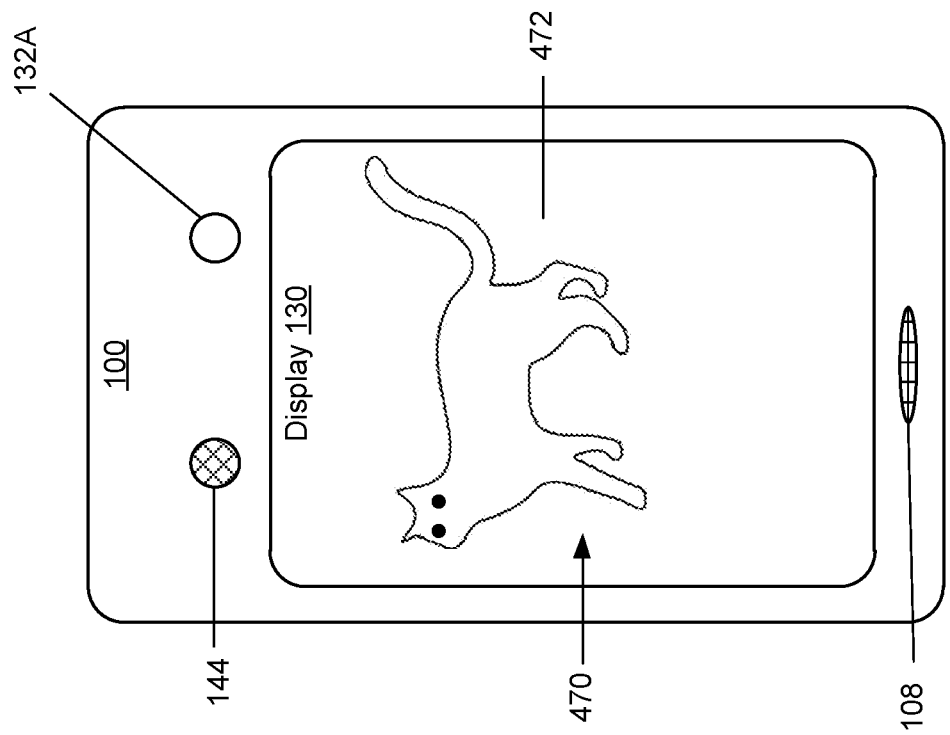
FIG. 4D illustrates content presented on a display of the electronic device of FIG. 3E, after the electronic device has adjusted camera settings to focus on the new ROI and/or to optimize the capture of video content of images within the new ROI, according to one or more embodiments.
Figure 4C:
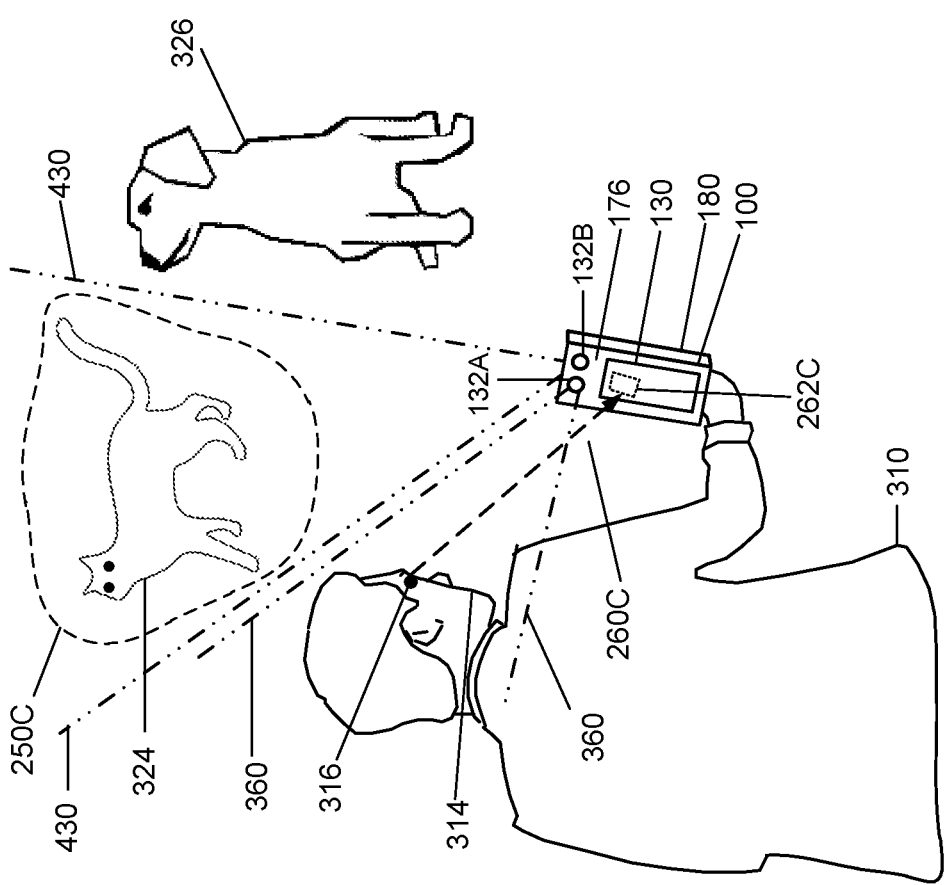
FIG. 4C is an example illustration of the electronic device that has automatically adjusted camera settings to capture images within the new ROI based on the eye gaze tracking, according to one or more embodiments.

Referring to FIG. 4C, electronic device 100 is further shown after electronic device 100 has determined that the user's eye gaze indicates a new, third ROI and has adjusted at least one camera setting of the active rear facing camera. CCM 136 enables electronic device 100 to map third location 262C (i.e., grid 139G) on display 130 to a new third ROI 250C containing cat 324. CCM 136 further enables electronic device 100 to generate at least one new camera setting 266 of the active rear facing camera 133A, at least partially based on the new third ROI 250C, and to adjust the active rear facing camera 133A using the generated new camera setting 266 such that the rear facing camera 133A focuses on the new third ROI 250C. In one embodiment, the generated camera settings 266 can be optimal camera settings 268 that provide an optimal sized, zoomed and focused image on display 130 of the video recording of third ROI 250C.

In one embodiment, adjusting the active rear facing camera using the generated new camera settings 266 can include adjusting a directional setting of the rear facing camera 133A to focus the FOV 430 of rear facing camera 133A on the new third ROI 250C determined from the current eye gaze location (i.e., third location 262C). In another embodiment, adjusting the active rear facing camera using the generated new camera settings 266 can include adjusting a zoom level of the rear facing camera 133A to magnify captured images of the new ROI (i.e., third ROI 250C). In an additional embodiment, adjusting the active rear facing camera using the generated new camera settings 266 can include adjusting a focal distance of the rear facing camera 133A to focus on the rear facing camera on the new ROI (i.e., third ROI 250C). Other camera settings adjustments can be made based on the detected amount of light, exposure settings and other identified image characteristics of the new ROI.

Turning to FIG. 4D, electronic device 100 is shown after determining new third ROI 250C and responding by adjusting camera settings of the active rear facing camera 133A. Electronic device 100 is illustrated with example GUI 440 presented on display 130 during video recording. GUI 470 includes captured video data (i.e., video image 472) of third ROI 250C containing cat 324. In FIG. 4D, electronic device 100 has adjusted a directional setting, zoom level and focal distance of the rear facing camera 133A to optimally capture video image 472 of the third ROI 250C and display the video image on display 130.

According to one aspect of the disclosure, CCM 136 enables electronic device 100 to track a current eye gaze direction and location by monitoring and periodically analyzing the second image 244 corresponding to image stream 240 from front facing camera 132A to identify a current eye gaze direction and location (e.g., third eye gaze direction 260C and third location 262C). CCM 136 further enables electronic device 100 to determine if the current eye gaze direction indicates a current location (i.e., third location 262C) that is different from the second location 262B. In response to determining that the current location (i.e., third location 262C) is different from the second location 262B, electronic device 100 maps the current eye gaze location (i.e., third location 262C) on the display to a new ROI (i.e., third ROI 250C) for selecting and focusing the active rear facing camera 133A. CCM 136 and AI engine 202 further enables electronic device 100 to generate at least one camera setting 266 of the rear facing camera 133A at least partially based on the third ROI 250C and to adjust the rear facing camera 133A using the generated camera settings 266 such that the rear facing camera 133A focuses on the third ROI 250C.

According to another aspect of the disclosure, generating camera settings 266 can include processor 102 receiving at least one camera parameter 264 from the active rear facing camera and determining a first zoom level for the new ROI based at least partially on the at least one camera parameter 264 and image characteristics 272 of the new ROI. Processor 102 can further determine a focal distance for the new ROI based at least partially on the at least one camera parameter 264 and image characteristics 272 of the new ROI. Processor 102 can further adjust the at least one rear facing camera using the determined zoom level and focal distance such that the new ROI is in focus on display 130.

In one embodiment, for example, identified/detected image characteristics 272 can include the detection of a face with a FOV at third ROI 250C. The detection of a face can be used by processor 102 to at least partially adjust one or more camera settings 266 to focus the camera on the detected face at the ROI. For example, adjusting camera settings to focus the camera on the detected face at the ROI can include adjusting a zoom level and focal distance towards the detected face and adjusting light levels measured at the detected face to optimize the capturing of images of the detected face.

In an additional embodiment, the current ROI (i.e., third ROI 250C) can be used to select an active rear facing camera from among the multiple rear facing cameras 133A-133C. CCM 136 can enable electronic device 100 to identify at least one image characteristic 272 of third ROI 250C and select, as an active camera, a first rear facing camera from among the multiple rear facing cameras, at least partially based on the identified at least one image characteristic 272 of the third ROI 250C.

Figure 5A:
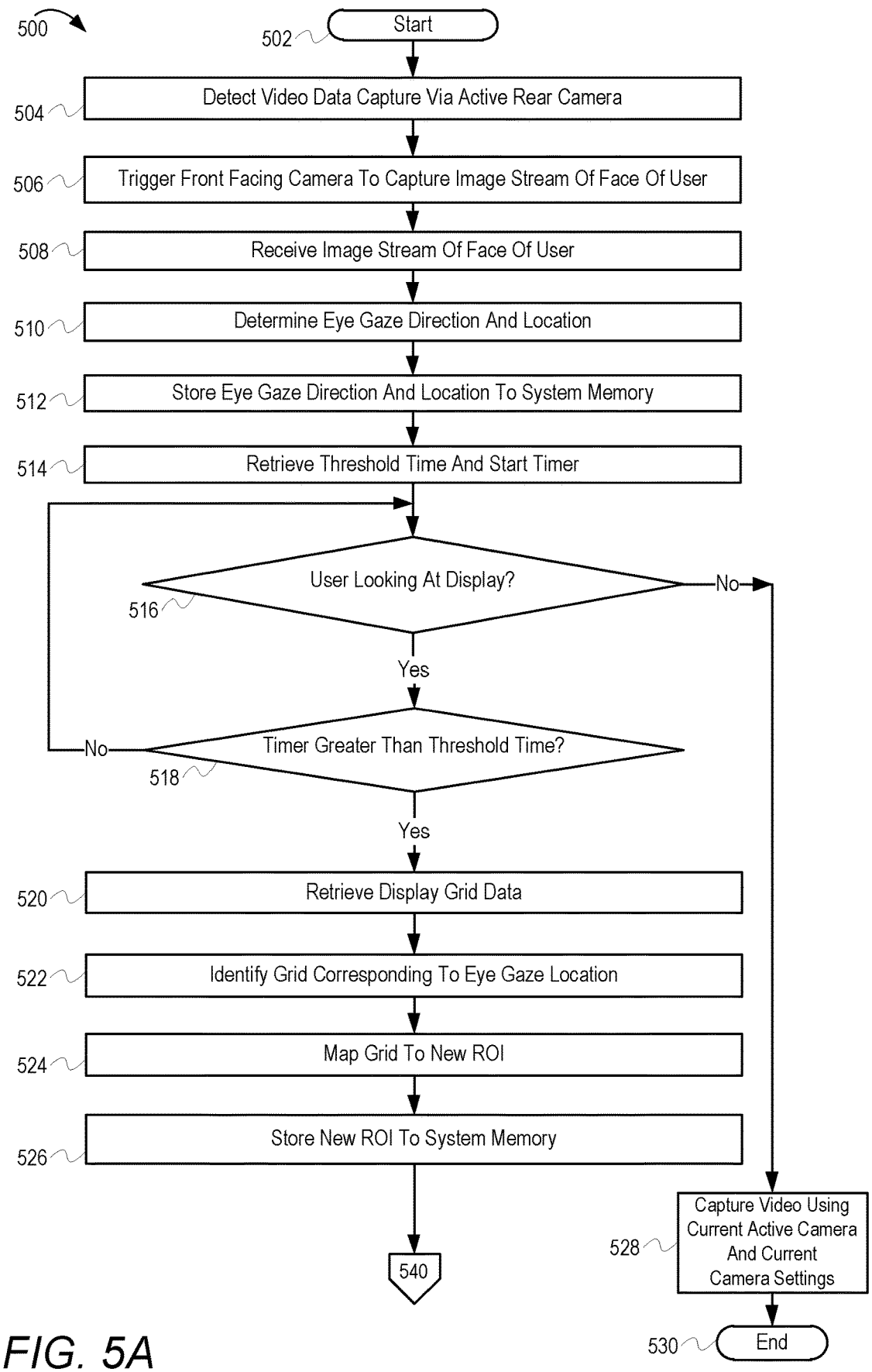
FIGS. 5A-5B (collectively FIG. 5) depict a flowchart of a method by which an electronic device generates and adjusts camera settings, based on eye gaze direction and location, for use by the electronic device to capture video images of a ROI, according to one or more embodiments.
Figure 5B:
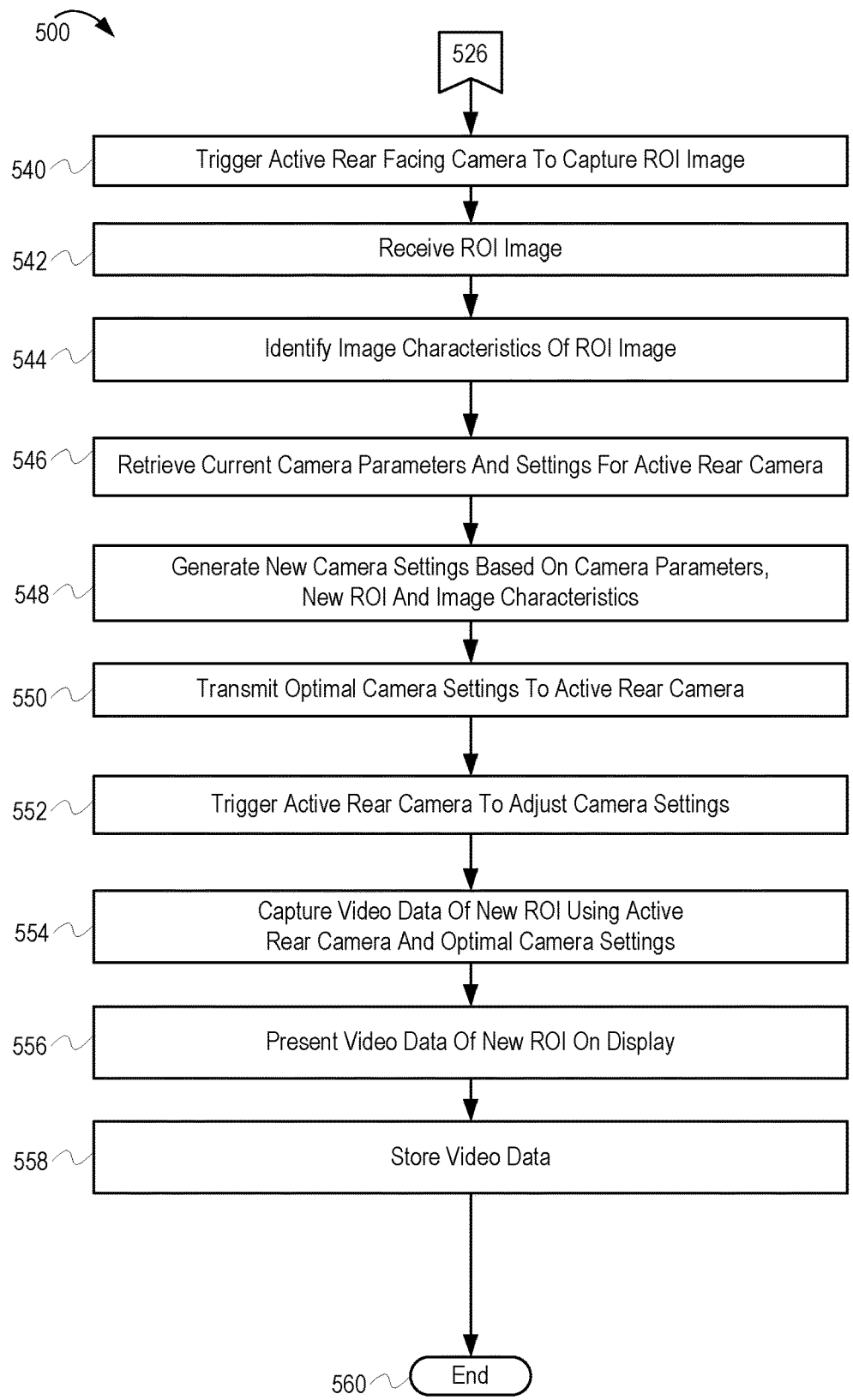

FIGS. 5A-5B (collectively FIG. 5) depict method 500 by which electronic device 100 generates and adjusts camera settings, based on eye gaze location, for use by electronic device 100 to capture video images of a ROI. FIG. 6 depicts method 600 by which electronic device 100 tracks an eye gaze direction of a user towards a location on a display of the device and generates and adjusts camera settings for use by the electronic device to capture video images of a ROI. The description of methods 500 and 600 will be described with reference to the components and examples of FIGS. 1-4D.

The operations depicted in FIGS. 5 and 6 can be performed by electronic device 100 or any suitable electronic device that includes front and rear cameras and the one or more functional components of electronic device 100 that provide/enable the described features. One or more of the processes of the methods described in FIGS. 5 and 6 may be performed by processor 102 executing program code associated with CCM 136.

With specific reference to FIG. 5A, method 500 begins at start block 502. At block 504, processor 102 detects that video data 270 is being recorded or captured by the current active rear facing camera (i.e., one of rear facing cameras 133A-133C). Processor 102 triggers front facing camera 132A to capture an image stream 240 including first image 242 containing a face 314 of user 310 (block 506). Processor 102 receives image stream 240 including first image 242 (block 508). Processor 102 determines second eye gaze direction 260B and corresponding second location 262B based on first image 242 retrieved from the image stream 240 (block 510). Processor 102 stores second eye gaze direction 260B and second location 262B to system memory 120 (block 512). The second eye gaze direction 260B corresponds to second location 262B on display 130 where the user is looking.

Processor 102 retrieves eye gaze threshold time 218 and starts timer 216 (block 514). Timer 216 tracks the amount of time that a user's eye gaze has rested/remained on display 130 of electronic device 100. Processor 102 determines if user 310 is looking at display 130 of electronic device 100 (decision block 516). In response to determining that user 310 is not looking at display 130, processor 102 captures video data 270 using the current active camera and current camera settings 266 (block 528). Method 500 then ends at end block 530. In response to determining that user 310 is looking at display 130, processor 102 determines if the value of timer 216 is greater than eye gaze threshold time 218 (decision block 518). Eye gaze threshold time 218 is a minimum amount of time that a user is looking at display 130. In response to determining that the value of timer 216 is not greater than eye gaze threshold time 218, processor 102 returns to decision block 516 to continue determining if user 310 is looking at display 130.

In response to determining that the value of timer 216 is greater than eye gaze threshold time 218, processor 102 retrieves display grid data 220 from system memory 120 (block 520) and identifies, based on the display grid data 220, a first grid (i.e., grid 139S) on display 130 that corresponds to the second location 262B on display 130 where the user is looking (block 522). Processor 102 maps the first grid 139S to the new second ROI 250B in a FOV of at least one of the rear facing cameras 133A-133C (block 524). Processor 102 stores the new second ROI 250B to system memory 120 (block 526).

With reference to FIG. 5B, processor 102 triggers the active rear facing camera to capture a ROI image 254 of the new second ROI 250B (block 540). Processor 102 receives ROI image 254 (block 542). Processor 102 identifies image characteristics 272 of the ROI image 254 associated with the second ROI 250B (block 544). Processor 102 retrieves the current camera parameters 264 and camera settings 266 for the active rear facing camera (block 546). Processor 102 generates at least one new camera setting 266 of the active rear facing camera, at least partially based on the current camera parameters 264, the second ROI 250B, and the identified image characteristics 272 (block 548).

In one embodiment, the generated camera settings 266 can be optimal camera settings 268 that provide an optimal directional setting, zoom level and focus on display 130 of the video recording of second ROI 250B. In one embodiment, processor 102 can generate optimal camera settings 268 at least partially using AI engine 202. The optimal camera settings 268 allow the second ROI 250B to be optimally captured within FOV 362 of the active rear camera.

Additionally, in one or more embodiments, electronic device 100 also can provide a focused view of objects within the ROI and can provide a non-focused (e.g., blurred) view of objects outside of the ROI. For example, electronic device 100 can provide a focused view of dog 326 inside second ROI 250B and a non-focused (blurred) view of cat 324 outside of second ROI 250B.

In one embodiment, generating optimal camera settings 268 can include processor 102 identifying a third region in the FOV of the active rear facing camera that is different than second ROI 250B and determining a second focal distance for the third region based at least partially on the camera parameters and image characteristics of the third region. Processor 102 can adjust the rear facing camera using the second focal distance such that the third region is out of focus on the display.

Processor 102 transmits the optimal camera settings 268 to the active rear facing camera (i.e., one of rear facing cameras 133A-133C) (block 550), and processor 102 triggers the active rear facing camera to adjust camera settings using the generated optimal camera settings 268 (block 552). Processor 102 captures video data 270 (i.e., captured video content) of new second ROI 250B using the active rear facing camera operating with optimal camera settings 268 (block 554). Optimal camera settings 268 can include zoom levels, focal distances, and directional settings that allow images that are desired to be captured with a camera FOV to be in focus, centered, and correctly sized. Processor 102 presents, on display 130, the video data 270 containing the zoomed, focused and directionally adjusted view of the second ROI 250B (block 556). Processor 102 stores to system memory 120, the video data 270 containing the zoomed, focused and directionally adjusted view of the second ROI 250B (block 558). Method 500 then terminates at end block 560.

Figure 6A:
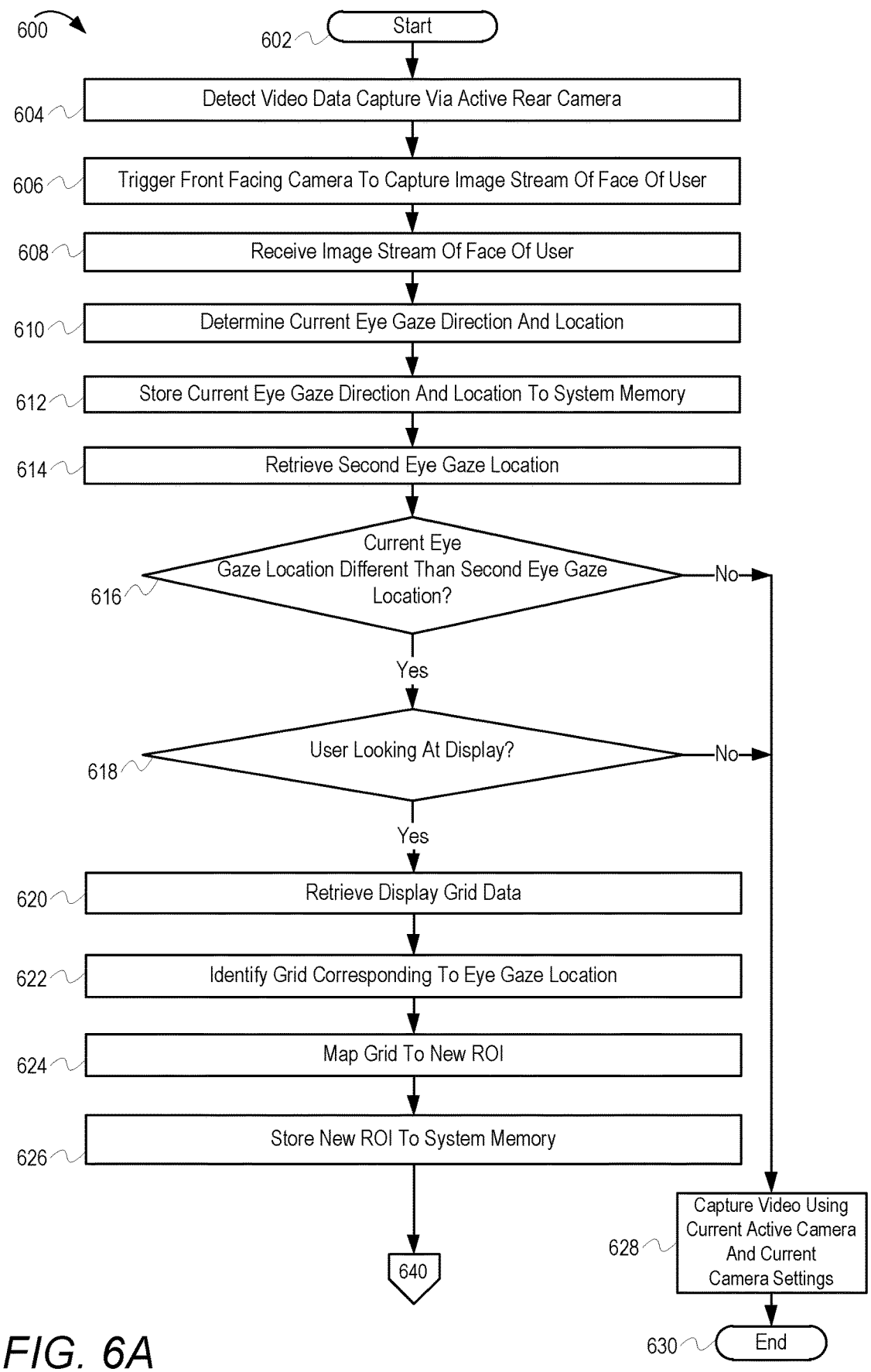
FIGS. 6A-6B (collectively FIG. 6) depict a flowchart of a method by which an electronic device tracks an eye gaze direction of a user on the device display and generates and adjusts camera settings for use by the electronic device to optimize capture of video images of the ROI, based on the eye gaze direction of the user, according to one or more embodiments.

Referring to FIG. 6 (6A and 6B), there is presented method 600 by which electronic device 100 tracks an eye gaze direction of a user looking at a video stream presented within a display and generates and adjusts camera settings for use by the electronic device to capture future video images of a ROI. With specific reference to FIG. 6A, method 600 begins at the start block 602. In an embodiment, method 600 can be repeated over a period of time to track the eye gaze direction and eye gaze location of a user. At block 604, processor 102 detects that video data 270 is being recorded or captured by the current active rear facing camera (i.e., one of rear facing cameras 133A-133C). Processor 102 triggers front facing camera 132A to capture (monitor) an image stream 240 including second image 244 containing a face 314 of user 310 (block 606). Processor 102 receives image stream 240 including second image 244 (block 608).

Processor 102 determines third eye gaze direction 260C and corresponding third location 262C based on second image 244 retrieved from the image stream 240 (block 610). Processor 102 optionally stores third eye gaze direction 260C and third eye gaze location 262C to system memory 120 (block 612). The third eye gaze direction 260C corresponds to third eye gaze location 262C on display 130 where the user is looking. In one embodiment, processor 102 continues to track the eye gaze location of the user by periodically monitoring image stream 240 (blocks 606, 608), and processor 102 analyzing images 244 corresponding to image stream 240 to identify the current eye gaze direction and eye gaze location (block 610).

Processor 102 retrieves the second eye gaze location 262B from system memory 120 (block 614). Processor 102 determines if the current eye gaze location (i.e., third location 262C) is different than the second eye gaze location 262B (decision block 616). In response to the current location not being different than the second location 262B, processor 102 continues to capture video data 270 using the current active camera and camera settings 266 (block 628). Method 600 then terminates at end block 630.

In response to the current location being different than the second location 262B, processor 102 determines if user 310 is looking at display 130 of electronic device 100 (decision block 618). In response to determining that user 310 is not looking at display 130, processor 102 captures video data 270 using the current active camera and current camera settings 266 (block 628). Method 600 then ends at end block 630. In response to determining that user 310 is looking at a different location of display 130, processor 102 retrieves display grid data 220 from system memory 120 (block 620) and identifies, based on the display grid data 220, a first grid (i.e., grid 139G) on display 130 that corresponds to the third location 262C on display 130 where the user is looking (block 622). Processor 102 maps the first grid 139G to the new third ROI 250C in a FOV of at least one of the rear facing cameras 133A-133C (block 624). Processor 102 stores the new third ROI 250C to system memory 120 (block 626).

Figure 6B:
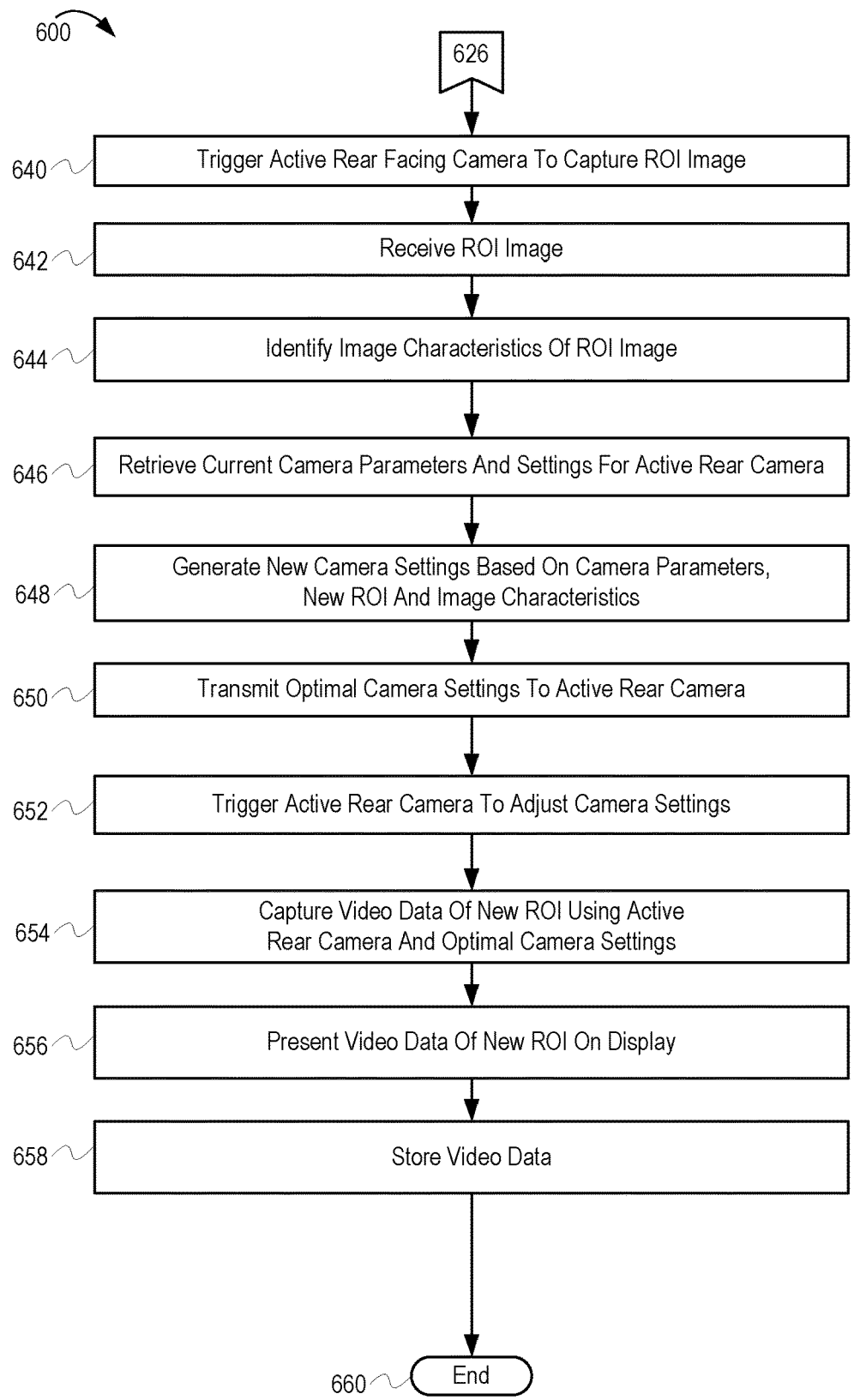

With reference to FIG. 6B, processor 102 triggers the active rear facing camera to capture a ROI image 254 of the new third ROI 250C (block 640). Processor 102 receives ROI image 254 (block 642). Processor 102 identifies image characteristics 272 of the ROI image 254 associated with the third ROI 250C (block 644). Processor 102 retrieves the current camera parameters 264 and camera settings 266 for the active rear facing camera (block 646). Processor 102 generates at least one new camera setting 266 of the active rear facing camera at least partially based on the current camera parameters 264, the third ROI 250C, and the identified image characteristics 272 (block 648).

In another example embodiment, an eye gaze area would encompass a smaller area of the overall FOV of the rear facing active camera (e.g., rear facing camera 133A). The image characteristics 272 used for focusing can be employed within the smaller FOV. Methodologies used to complete this focusing can include contrast-based auto-focus, phase detection autofocus, computer vision (CV) techniques, machine learning (ML) and artificial intelligence (AI) based techniques to determine the subject of interest within the smaller FOV. The FOV can subsequently be adjusted based on this determination. For example, a user may be looking at a painting in a museum. The initial target FOV may be smaller than needed to capture the entire painting within the FOV. Using one or more of the focus methodologies, the target FOV can be adjusted to a larger FOV to fully capture the painting in the museum.

In one embodiment, the generated camera settings 266 can be optimal camera settings 268 that provide an optimal directional setting, zoom level, and focal distance for use by the active camera during video recording of third ROI 250C. In one embodiment, processor 102 can generate optimal camera settings 268 at least partially using AI engine 202. The optimal camera settings 268 allow the third ROI 250C to be optimally captured within FOV 430 of the active rear camera.

Processor 102 transmits the optimal camera settings 268 to the active rear facing camera (i.e., one of rear facing cameras 133A-133C) (block 650). Processor 102 triggers the active rear facing camera to adjust camera settings using the generated optimal camera settings 268 (block 652). Processor 102 captures video data 270 (i.e., captured video content) of new third ROI 250C using the active rear facing camera operating with the generated optimal camera settings 268 (block 654). Optimal camera settings 268 can include zoom levels, focal distances and directional settings that allow images that are desired to be captured with a camera FOV to be in focus, centered and correctly sized.

As previously introduced, optimal camera settings 268 can further include digital crop levels, focal distance of the focus module and directional audio zoom. The directional audio zoom enables microphone 108 to be tuned to receive audio primarily in the direction of a cropped FOV in a desired ROI. Optimal camera settings 268 further include modified electronic image stabilization (EIS) that enables stabilization to be optimized for subjects in a cropped FOV and exposure compensation that enables the cropped FOV to not be under or over exposed in a camera preview (viewfinder). Processor 102 presents, on display 130, the video data 270 containing the zoomed, focused and directionally adjusted view of the third ROI 250C (block 656). Processor 102 stores to system memory 120, the video data 270 containing the zoomed, focused and directionally adjusted view of the second ROI 250B (block 658). Method 600 then terminates at end block 660.

In the above-described methods of FIGS. 5A-6B, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
   a front surface and a rear surface;
   a display embedded in the front surface;
   at least one front facing camera and at least one rear facing camera;
   a memory having stored thereon a camera control module (CCM) for controlling the at least one front facing camera and the at least one rear facing camera; and
   at least one processor communicatively coupled to the display, each of the at least one front facing camera, each of the at least one rear facing camera, and to the memory, the at least one processor executing program code of the CCM and configuring the electronic device to:
   in response to detecting a video recording session is being record via the at least one rear facing camera, capture, via the at least one front facing camera, a first image stream containing a face of a first user;
   determine a first eye gaze direction of the first user based on a first image retrieved from the first image stream, the first eye gaze direction corresponding to a first location on the display where the first user is looking;
   map the first location on the display to a first region of interest (ROI) for focusing the at least one rear facing camera;
   generate at least one camera setting of the at least one rear facing camera at least partially based on the first ROI, wherein the at least one processor:

receives at least one camera parameter from the at least one rear facing camera;
determines a first zoom level for the first ROI based at least partially on the at least one camera parameter and image characteristics of the first ROI; and
determines a first focal distance for the first ROI based at least partially on the at least one camera parameter and image characteristics of the first ROI; and
adjust the at least one rear facing camera using the generated at least one camera setting comprising the first zoom level and the first focal distance such that the at least one rear facing camera focuses on the first ROI, and the first ROI is in focus on the display.

2. The electronic device of claim 1, wherein the at least one processor:
tracks the eye gaze direction by monitoring and periodically analyzing the first image corresponding to the first image stream from the least one front facing camera to identify a current eye gaze direction;
determines if the current eye gaze direction indicates a current location on the display that is different from the first location on the display;
in response to determining that the current location is different from the first location, maps the current location on the display to a second ROI for focusing the at least one rear facing camera;
generates at least one new camera setting of the at least one rear facing camera at least partially based on the second ROI; and
adjusts the at least one rear facing camera using the generated at least one camera setting such that the at least one rear facing camera focuses on the second ROI.

3. The electronic device of claim 2, wherein:
to generate the at least one new camera setting of the at least one rear facing camera, the at least one processor processes the current eye gaze direction through the artificial intelligence engine, which generates the at least one new camera setting for the at least one rear facing camera based at least partially on the current eye gaze direction; and
to adjust the at least one rear facing camera, the at least one processor adjusts at least one of a zoom and a focal distance of the at least one rear facing camera to focus a field of view of the at least one rear-facing camera on the second ROI.

4. The electronic device of claim 1, wherein the at least one processor:
identifies a second region of the at least one rear facing camera that is different than the first ROI;
determines a second focal distance for the second region based at least partially on the at least one camera parameter and image characteristics of the second region; and
adjusts the at least one rear facing camera using the second focal distance such that the second region is out of focus on the display.

5. The electronic device of claim 1, wherein the at least one processor:
captures, via the at least one rear facing camera, a second image stream containing a focused view of the first ROI; and
presents, on the display, the second image stream containing the focused view of the first ROI.

6. The electronic device of claim 1, wherein to map the first location on the display to the first ROI, the at least one processor:

retrieves display grid data from the memory;
identify, based on the display grid data, a first grid on the display that corresponds to the first location on the display where the first user is looking; and
map the first grid to the first ROI of the at least one rear facing camera.

7. The electronic device of claim 1, wherein the at least one rear facing camera comprises multiple rear facing cameras, each having different image capturing image characteristics, and the at least one processor:
identifies at least one image characteristic of the first ROI; and
selects, as an active camera, a first rear facing camera from among the multiple rear facing cameras, at least partially based on the identified at least one image characteristic of the first ROI.

8. The electronic device of claim 1, wherein to generate at least one camera setting the processor processes the first eye gaze direction through an artificial intelligence engine, which generates the at least one camera setting for the at least one rear facing camera based at least partially on the first eye gaze direction.

9. A method comprising:
in response to detecting a video recording session is being recorded via at least one rear facing camera of an electronic device, capturing, via at least one front facing camera, a first image stream containing a face of a first user;
determining, via at least one processor, a first eye gaze direction of the first user based on a first image retrieved from the first image stream, the first eye gaze direction corresponding to a first location on a display where the first user is looking;
mapping the first location on the display to a first region of interest (ROI) for focusing the at least one rear facing camera;
generating at least one camera setting of the at least one rear facing camera at least partially based on the first ROI, wherein the generating comprises:
receiving at least one camera parameter from the at least one rear facing camera;
determining a first zoom level for the first ROI based at least partially on the at least one camera parameter and image characteristics of the first ROI; and
determining a first focal distance for the first ROI based at least partially on the at least one camera parameter and image characteristics of the first ROI; and
adjusting the at least one rear facing camera using the generated at least one camera setting comprising the first zoom level and the first focal distance such that the at least one rear facing camera focuses on the first ROI and the first ROI is in focus on the display.

10. The method of claim 9, further comprising:
tracking the eye gaze direction by monitoring and periodically analyzing the first image corresponding to the first image stream from the least one front facing camera to identify a current eye gaze direction;
determining if the current eye gaze direction indicates a current location on the display that is different from the first location on the display;
in response to determining that the current location is different from the first location, mapping the current location on the display to a second ROI for focusing the at least one rear facing camera;
generating at least one camera new setting of the at least one rear facing camera at least partially based on the second ROI; and adjusting the at least one rear facing camera using the generated at least one new camera setting such that the at least one rear facing camera focuses on the second ROI.

11. The method of claim 10, wherein:
generating the at least one new camera setting of the at least one rear facing camera comprises processing the current eye gaze direction through the artificial intelligence engine, which generates the at least one new camera setting for the at least one rear facing camera based at least partially on the current eye gaze direction; and
adjusting the at least one rear facing camera comprises adjusting at least one of a zoom and a focal distance of the at least one rear facing camera to focus a field of view of the at least one rear-facing camera on the second ROI.

12. The method of claim 9, further comprising:
identifying a second region of the at least one rear facing camera that is different than the first ROI;
determining a second focal distance for the second region based at least partially on the at least one camera parameter and image characteristics of the second region; and
adjusting the at least one rear facing camera using the second focal distance such that the second region is out of focus on the display.

13. The method of claim 9, further comprising:
capturing, via the at least one rear facing camera, a second image stream containing a focused view of the first ROI; and
presenting, on the display, the second image stream containing the focused view of the first ROI.

14. The method of claim 9, wherein to map the first location on the display to the first ROI, the method further comprises:
retrieving display grid data from a memory;
identifying, based on the display grid data, a first grid on the display that corresponds to the first location on the display where the first user is looking; and
mapping the first grid to the first ROI of the at least one rear facing camera.

15. The method of claim 9, wherein the at least one rear facing camera comprises multiple rear facing cameras, each having different image capturing characteristics, the method further comprises:
identifying at least one characteristic of the first ROI; and
selecting, as an active camera, a first rear facing camera from among the multiple rear facing cameras, at least partially based on the identified at least one characteristic of the first ROI.

16. The method of claim 9, wherein generating the at least one camera setting comprises processing the first eye gaze direction through an artificial intelligence engine, which generates the at least one camera setting for the at least one rear facing camera based at least partially on the first eye gaze direction.

17. A computer program product comprising:
a non-transitory computer readable storage device having stored thereon program code which, when executed by at least one processor of an electronic device having a front surface, a rear surface, a display embedded in the front surface, at least one front facing camera, at least one rear facing camera, and a memory, enables the electronic device to complete functionality of:
in response to detecting a video recording session is being recorded via the at least one rear facing camera, capturing, via the at least one front facing camera, a first image stream containing a face of a first user;
determining a first eye gaze direction of the first user based on a first image retrieved from the first image stream, the first eye gaze direction corresponding to a first location on a display where the first user is looking;
mapping the first location on the display to a first region of interest (ROI) for focusing the at least one rear facing camera;
generating at least one camera setting of the at least one rear facing camera at least partially based on the first ROI, wherein the generating comprises:
receiving at least one camera parameter from the at least one rear facing camera;
determining a first zoom level for the first ROI based at least partially on the at least one camera parameter and image characteristics of the first ROI; and
determining a first focal distance for the first ROI based at least partially on the at least one camera parameter and image characteristics of the first ROI; and
adjusting the at least one rear facing camera using the generated at least one camera setting comprising the first zoom level and the first focal distance such that the at least one rear facing camera focuses on the first ROI and the first ROI is in focus on the display.

18. The computer program product of claim 17, wherein the program code for controlling the at least one front facing camera and the at least one rear facing camera comprises program code that further enables the electronic device to complete the functionality of:
tracking the eye gaze direction by monitoring and periodically analyzing the first image corresponding to the first image stream from the least one front facing camera to identify a current eye gaze direction;
determining if the current eye gaze direction indicates a current location on the display that is different from the first location on the display;
in response to determining that the current location is different from the first location, mapping the current location on the display to a second ROI for focusing the at least one rear facing camera;
generating at least one new camera setting of the at least one rear facing camera at least partially based on the second ROI; and
adjusting the at least one rear facing camera using the generated at least one new camera setting such that the at least one rear facing camera focuses on the second ROI.

19. The computer program product of claim 18, wherein:
the program code for generating the at least one camera setting of the at least one rear facing camera comprises program code that further enables the electronic device to complete the functionality of processing the current eye gaze direction through an artificial intelligence engine, which generates the at least one camera setting for the at least one rear facing camera based at least partially on the current eye gaze direction; and
the program code for generating the at least one camera setting of the at least one rear facing camera comprises program code that further enables the electronic device to complete the functionality of adjusting at least one of a zoom and a focal distance of the at least one rear facing camera to focus a field of view of the at least one rear-facing camera on the second ROI.

20. The computer program product of claim 17, wherein the program code for generating of the at least one camera setting comprises program code for processing the first eye gaze direction through an artificial intelligence engine, which generates the at least one camera setting for the at least one rear facing camera based at least partially on the first eye gaze direction.

\* \* \* \* \*